US010748579B2

(12) United States Patent
Singhal et al.

(10) Patent No.: US 10,748,579 B2
(45) Date of Patent: Aug. 18, 2020

(54) EMPLOYING LIVE CAMERA FEEDS TO EDIT FACIAL EXPRESSIONS

(71) Applicant: ADOBE INC., San Jose, CA (US)

(72) Inventors: Gagan Singhal, Delhi (IN); Manik Singhal, Ghzaiabad (IN)

(73) Assignee: Adobe Inc., San Jose, CA (US)

( * ) Notice: Subject to any disclaimer, the term of this patent is extended or adjusted under 35 U.S.C. 154(b) by 375 days.

(21) Appl. No.: 15/335,318

(22) Filed: Oct. 26, 2016

(65) Prior Publication Data
US 2018/0114546 A1 Apr. 26, 2018

(51) Int. Cl.
*G06K 9/00* (2006.01)
*G06K 9/46* (2006.01)
*G11B 27/036* (2006.01)
*H04N 21/472* (2011.01)

(52) U.S. Cl.
CPC ........ *G11B 27/036* (2013.01); *G06K 9/00208* (2013.01); *G06K 9/00315* (2013.01); *G06K 9/4671* (2013.01); *H04N 21/47205* (2013.01)

(58) Field of Classification Search
CPC ............. G11B 27/036; G06K 9/00315; G06K 9/00744; H04N 7/183; H04N 21/2187
See application file for complete search history.

(56) References Cited

U.S. PATENT DOCUMENTS

| 8,040,247 | B2 | 10/2011 | Gunaratne |
| 9,498,645 | B2 | 11/2016 | Bzudsek et al. |
| 9,646,195 | B1 | 5/2017 | Kim et al. |
| 9,747,716 | B1 | 8/2017 | Mallet et al. |
| 2003/0234871 | A1 | 12/2003 | Squilla et al. |
| 2004/0170337 | A1 | 9/2004 | Simon et al. |
| 2007/0019882 | A1 | 1/2007 | Tanaka et al. |
| 2014/0153832 | A1* | 6/2014 | Kwatra ............... G06T 11/00 382/195 |
| 2014/0309027 | A1* | 10/2014 | Ichimura ............ A63F 13/10 463/31 |
| 2014/0362091 | A1 | 12/2014 | Bouaziz et al. |

(Continued)

OTHER PUBLICATIONS

Arad, N., Dyn, N., Reisfeld, D., & Yeshurun, Y. (1994). Image warping by radial basis functions: Application to facial expressions. CVGIP: Graphical Model and Image Processing, 56(2), 161-172.

*Primary Examiner* — Eileen M Adams
(74) *Attorney, Agent, or Firm* — Shook, Hardy & Bacon L.L.P.

(57) ABSTRACT

Facial expressions depicted in image data are edited based on variations of facial expressions depicted across a plurality of frames in other image data. The facial expression of a target subject, depicted in a first image data set, is edited based on the facial expression of a preview subject depicted in a second image data set. The target subject's facial expression is automatically edited based on variations in the of the preview subject's facial expression. A camera device captures video image data of the preview subject. The camera provides a live data image feed to a face-editing engine. The engine edits the face of the target subject's based on the varying face of the preview subject. In real time, for each frame of the data image feed, a user interface simultaneously displays both the varying face of the preview subject and the edited face of the target subject.

20 Claims, 13 Drawing Sheets

(56) References Cited

U.S. PATENT DOCUMENTS

| | | |
|---|---|---|
| 2016/0065841 A1* | 3/2016 | Kuo .................. H04N 5/23219 348/222.1 |
| 2016/0110543 A1* | 4/2016 | Park ..................... G06F 21/563 726/22 |
| 2016/0328825 A1 | 11/2016 | Yu |
| 2017/0091994 A1 | 3/2017 | Beeler et al. |
| 2017/0236250 A1 | 8/2017 | Kim et al. |
| 2018/0068178 A1* | 3/2018 | Theobalt ............ G06K 9/00315 |

* cited by examiner

EMPLOYING LIVE CAMERA FEEDS TO EDIT FACIAL EXPRESSIONS

BACKGROUND

One important aspect of digital images are the facial expressions of subjects depicted in the digital image. For instance, facial expressions often convey information to a viewer, such as the subject's emotions or mood. Accordingly, in order to alter or modify the depicted emotion or mood, an editor may desire to edit the facial expression of one or more subjects of the image.

Facial expressions include a composite of different facial features, such as eyes, nose, mouth, and the like. When a subject varies their expression by varying the size, shape, or orientation of the features, the subject may intentionally or unintentionally couple the variations of multiple features. For instance, when a subject smiles, they may simultaneously vary the shape of their mouth and widely open their eyes. Furthermore, the relationship between the coupling of the variations of the multiple features may be complex, e.g. when smiling, a relationship between the variation of the shape of the mouth and the openness of the subject's eyes may be nonlinear.

Therefore, to realistically depict an alteration of the subject's emotions or moods when editing facial expressions, such complex coupling of the edited features may be required. Accordingly, to realistically alter a subject's emotions or moods, an editor may desire to generate complex and/or nonlinear coupling of the variations of multiple facial features.

SUMMARY

Embodiments of the present invention are directed towards employing isomorphic face models and image data of a preview subject, such as but not limited to a user, to edit the face of a target subject, such as but not limited to a real-life individual or digital character, depicted in other image data. A target frame of the target subject is provided to a face-editing engine. A camera provides video feed of the preview subject to the face-editing engine. During the capture of the frames of the video feed, the preview subject typically varies their facial expression.

For each frame of the video, the face-editing engine updates the face models for both the preview and target subjects in real time. Updating the face models is based on detected variations across the frames of the video feed of the preview subject. Thus, when updated based on a current frame of the video feed, the model for the target subject models the facial expression of the preview subject, as depicted in the current frame. The face-editing engine updates the target frame based on the updated face models. When the target frame is updated, the facial expression of the target subject is edited to include similar features to that of the preview subject's current facial expression.

Accordingly, the face of the target subject is automatically edited, in real time, to reflect the variations in the face of the preview subject. For each frame of the video feed of the preview subject, a display device, in real time, simultaneously displays the video feed and the edited target frame. Accordingly, the preview subject is enabled to simultaneously view their varying face, as well as the correspondingly edited face of the target subject.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1A:
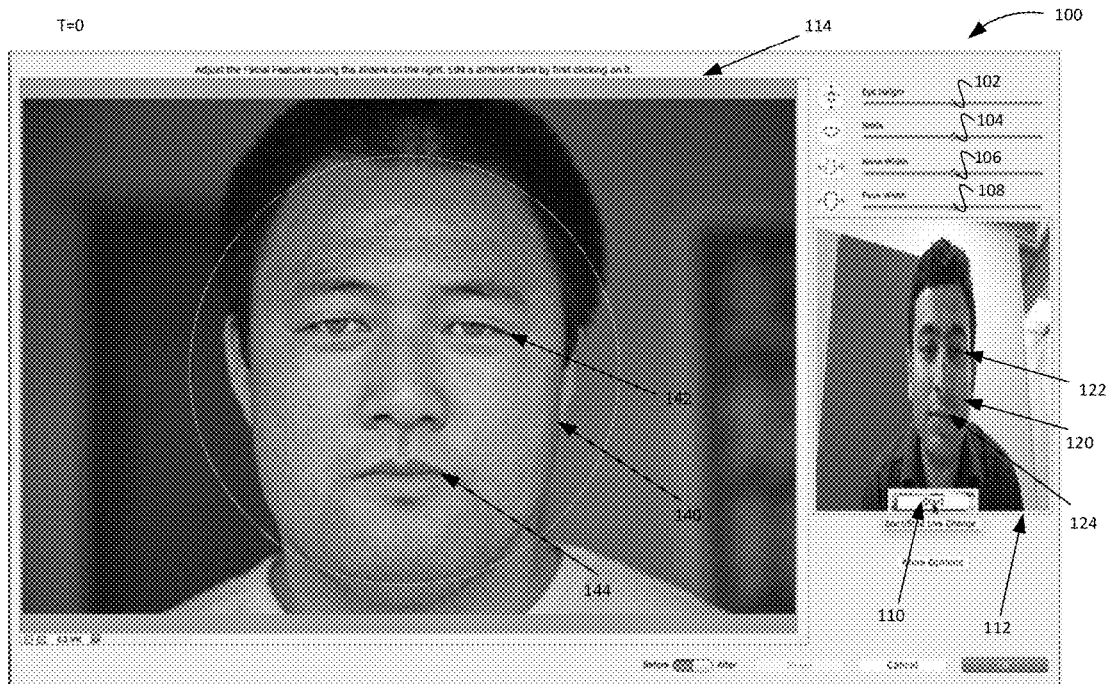
FIG. 1A illustrates an exemplary embodiment of a user interface employed by a preview subject to edit the facial expression of a target subject via methods consistent with the various embodiments presented herein.

As used herein, the term "target subject" may refer to any human or non-human individual or subject that includes facial features and/or facial expressions depicted in image data. As described, the various embodiments are directed towards editing the facial features and/or facial expressions of the target subject. The term "preview subject" may refer to any human or non-human individual or subject that includes facial features and/or facial expressions that are employed to edit the corresponding facial features and/or facial expressions of the target subject. At least one of the target subject or the preview subject may be a real-life or physical subject. In some of the embodiments, at least one of the target subject or the preview subject may be a digital, virtual, or non-physical subject, such as but not limited to an animated character, avatar, or the like, including human and non-human characters. Editing the facial features and/or facial expressions of the target subject may include editing the image data that depicts the target subject.

As used herein, the term "real time" may refer to a response time of a system or method. For instance, in some embodiments, a system or method may be a real time system or method when the response time of the system or method is less than a threshold response time. As used herein, the term "near real time" may be used similarly to the term real time. For example, a near real time system or method may be a system or method with a response time that is equal to, or substantially equal to the threshold response time. In at least one embodiment, a near real time system or method may include a response time that is slightly larger than (or slightly less than) the threshold response time.

As used herein, the term "response time" may refer to the difference in time, time differential, or time lag, from the time or instant a preview subject varies their facial features and the time or instant to when the edited image data depicting the corresponding varied facial features of the target subject is displayed via one of the embodiments described herein. In at least one embodiment, the term response time refers to the difference in time from when image data depicting the varied features of the preview subject is displayed to when the edited image data depicting the corresponding varied features of the target subject is displayed.

In various embodiments, the threshold response time associated with real time and/or near real time systems and methods may be such that the associated response time is imperceptible, or at least almost imperceptible to a human user. Thus, the terms real time and/or near real time may be used synonymously to refer to systems and methods that include response times (and associated threshold response times) that are imperceptible, or at least almost imperceptible to a human user. For instance, a preview subject may vary their facial expressions. In a real time or near real time embodiment, the image data depicting the target subject is updated to reflect the edited corresponding facial features of the target subject, within a response time that is imperceptible, or at least almost imperceptible, to a human user viewing both the image data depicting the preview subject and the edited image data depicting the target subject.

Various embodiments are discussed throughout in conjunction with FIGS. 1A-9. However, briefly here, the various embodiments include systems and methods for automatically editing the facial expressions depicted in image data based on variations of facial expressions depicted in other image data. In at least one embodiment, the facial expression of a target subject, such as but not limited to a real-life individual or digital character that is depicted in a first image data set, is edited based on the facial expression of a preview subject that is depicted in a second image data set. For instance, the preview subject may include a user. More specifically, the target subject's facial expression is automatically edited based on variations in the preview subject's facial expression. For instance, the variations in the preview subject's facial expression may be depicted across a plurality of data frames of the second image data set.

In some embodiments, one or more camera devices capture and provide the second image data set that includes at least the face of the preview subject (the preview face). The second image data set (the preview image data) may include video data. During the capture of the preview data, the preview subject typically varies their facial expression. The face of the target subject (the target face) is automatically edited, modified, and/or updated based on the variances of the preview face. When editing the target face, the first image data set (the target image data), or at least a copy of the first image data set, is automatically updated to depict the edited, modified, and/or updated target face.

In some embodiments, the camera device provides the preview video data to a face-editing engine in real time (or near real time), e.g. the preview image data is provided via a live camera feed. In such embodiments, the face-editing engine determines, in real time, the variances of the preview face for each data frame (or at least a subset of the data frames) of the preview video data. For each (or at least a subset) of the frames (and in real time), the frame is analyzed and the target face in the target image data is updated based on the variances of the preview face in that frame.

A user interface, displayed on a display device, may simultaneously display, in real time, both the preview video data and the updated target data, where the updated target data depicts the updated target face. Accordingly, as the live camera captures the preview subject's varying facial expression, the preview subject (or another user) may simultaneously view, in real time, their varying facial expression, as well as the resulting edited target facial expression.

When the target image data is updated for each frame of the preview video data, a plurality of updated target data frames may be generated. Each updated frame of the target data corresponds to one of the frames of the preview video data. Accordingly, target video data may be generated that depicts the varying target face corresponding to the varying preview face.

FIG. 1A illustrates an exemplary embodiment of a user interface (UI) 100 employed by a preview subject (or another user) to edit the facial expression of a target subject via methods consistent with the various embodiments presented herein. UI 100 includes at least two display windows. Preview display window 112 displays one or more frames of the image data of the preview face 120 (the preview image data). Thus, preview display window 112 depicts the preview subject. In contrast, target display window 114 displays image data of the target face 140 (the target image data). Accordingly, the target display 114 window depicts the target subject.

The preview image data may be received, by a face-editing engine, via one or more camera devices focused on the preview subject. The one or more camera devices capture the preview image data. The preview image data includes a plurality of image data frames. For instance, the preview image data may be video image data. As such, the face-editing engine provides the preview image data to UI 100 such that the preview display window 112 displays the preview video image data. In at least one embodiment, UI 100 displays the preview image data in real time (or near real time), with respect to the capturing of the video preview data, e.g. a live camera feed that provides the preview image data. In other embodiments, there is a temporal gap between capturing the preview image data and the editing process.

In contrast, the target image data may include a single frame of image data of the target face. The face-editing engine may receive the target image data via one or more data files. However, other embodiments are not so constrained, and the target image data may include a plurality of image data frames. For instance, the target image data may include video image data. Each (or at least a subset) of the one or more frames of the target video image data may be updated, in accordance to the various embodiments discussed herein.

In at least one embodiment, one or more camera devices, focused on the target subject, capture the one or more frames of the target image data. As shown in FIG. 1A, the target subject is a real-life individual. However, in other embodiments, the target subject is a digital (or virtual) subject or character that is at least partially digitally created. For instance, the target subject may be a digital character in the context of a video game, virtual reality (VR) scene, augmented reality (AR) scene, or the like. In at least one embodiment, the target subject is a composite character, i.e. a composite or blend of one or more real-life subjects and/or one or more virtual subjects. In some embodiments, such as but not limited to those related to VR and AR applications, the target subject is a virtual avatar for a real-life subject, such as but not limited to the preview subject.

In the various embodiments, the face-editing engine generates a face model for the target face 140 based on the target image data. As the preview subject varies their facial expression across the plurality of preview data frames, the face model for the target face 140 is automatically updated based on the variation of the preview face 120 across the plurality of preview data frames. The target image data is updated based on the updated face model for the target face 140. Accordingly, the updated target image data depicts an equivalent, or at least an approximation with a high degree of fidelity, of the variation of the facial expression of the preview face 120.

More specifically, similar to the target face, the face-editing engine generates one or more face models for the preview face 120 based on the preview image data. In various embodiments, the face-editing engine generates a reference face model for the preview face (the reference preview face model). The reference preview face model is based on an initial or first frame of the preview image data (reference preview image data). The engine analyzes a second frame of the preview image data (the current preview frame). For instance, the second frame may be captured subsequent to the first frame. Based on the analyses of the current preview frame, the engine updates a current face model for the preview face (the current preview face model). Thus, for one or more frames of the preview image data, updating the current preview face model is based on the current preview frame.

The face-editing engine updates the target face model based on a comparison of the current preview face model and the reference preview face model. The comparison may generate a difference (or variation) between the current and reference preview face models. The generated differences in the current and reference preview face models indicate the variance in the preview subject's facial expression between the reference and current preview data frames. Because the target face model is updated based on this difference, when updating the target image data, the variation in the facial features of the preview face may be replicated (or at least approximated with a high degree of fidelity) in the corresponding facial features of the target face.

The capturing of the reference preview image data is initiated when the user indicates to start the editing process, via the start/stop button 110 of UI 100. In UI 100, shown in FIG. 1A, the preview subject is initiating the editing process via the start/stop button 110. Thus, preview display window 112 displays the reference preview image data The moment when the reference preview image data is captured is indicated as T=0.

Figure 1B:
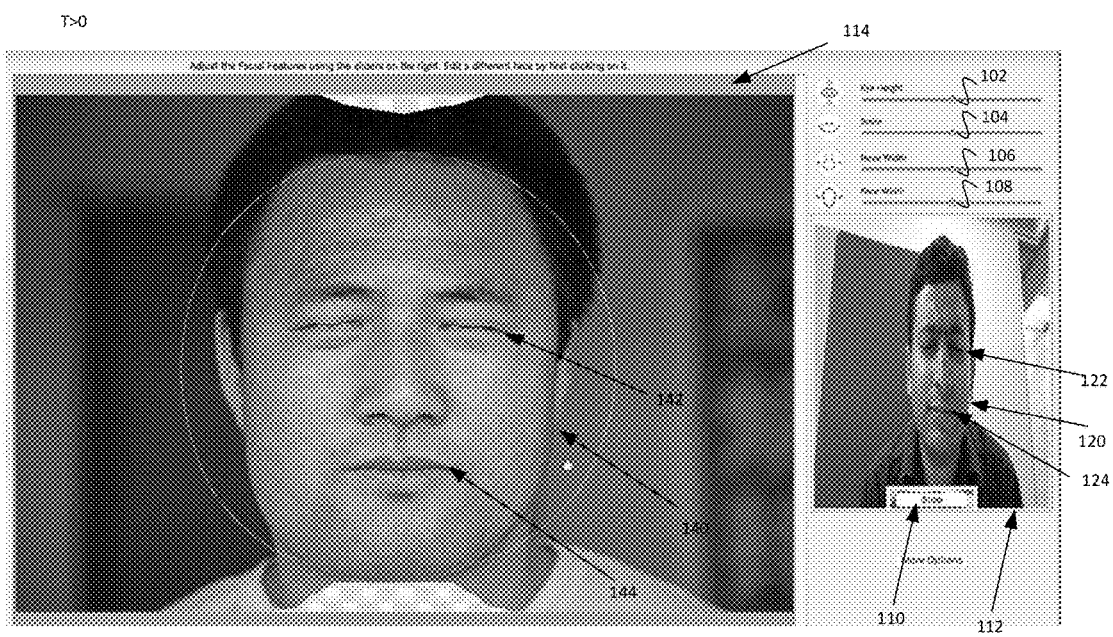
FIG. 1B illustrates the user interface of FIG. 1A, wherein the facial expression of the target subject has been edited via methods consistent with the various embodiments presented herein.

FIG. 1B illustrates the UI 100 of FIG. 1A, wherein the facial expression of the target subject has been edited via methods consistent with the various embodiments presented herein. Thus, FIG. 1B illustrates UI 100 at a later moment in time (T>0 or T=current time), after the preview subject has initiated the editing process and after a camera device has captured and provided the reference preview image data. In real time, preview display window 112 displays the current preview image data. As shown in the current preview face 120 of FIG. 1B, the preview subject has distorted/varied their facial expression by at least closing their eyes 122 and varying the shape of their mouth 124 (as compared to the reference preview face 120 of FIG. 1A).

In real time (with respect to capturing the preview image data), the target display window 114 simultaneously displays the currently edited target image data which depicts the edited target face 140. Note that in the edited target face 140, (and in real time) the target subject's eyes 142 have been automatically closed and the shape of the target subject's mouth 144 has been automatically varied to reflect the current variations in the preview subject's facial expressions, with respect to the reference preview image data of FIG. 1A. The preview subject may terminate the editing proves via start/stop button 110.

FIGS. 7A-8B show additional examples of the preview subject automatically editing the target subject's facial expression via UI 100 and various embodiments of the processes and methods discussed herein. Thus a comparison of the preview image data and the updated target image data depicted in FIGS. 1B and 7A-8B, show various examples of the results of editing the target face based on variations of the preview face, provided via a live camera feed. More specifically, for each of FIGS. 1B and 7A-8B, note the correspondence between the variations of the current shapes of the preview subject's eyes 122 and mouth 124 (with respect to the reference preview shapes shown in preview display window 112 of FIG. 1A) and the variations of the current shapes of the target subject's eyes 142 and mouth 144 (with respect to the reference target shapes shown in target display window 114 in FIG. 1A).

Figure 7A:
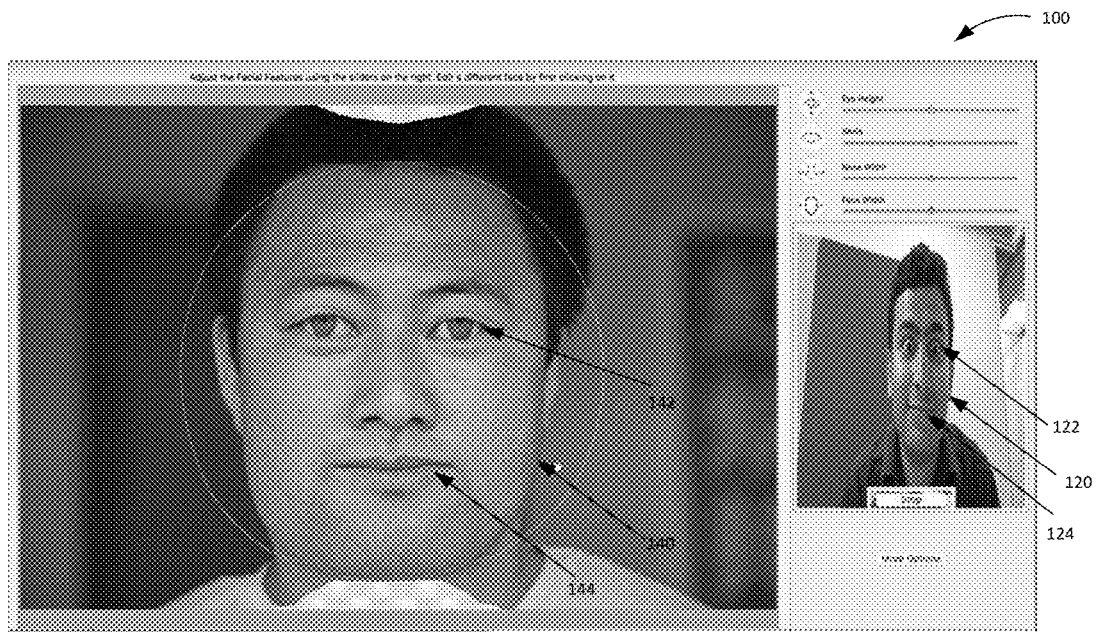
FIG. 7A illustrates the user interface of FIG. 1A, wherein the facial expression of the target subject has been edited to include widely opened eyes based on current preview image data depicting the preview subject widely opening their eyes.
Figure 7B:
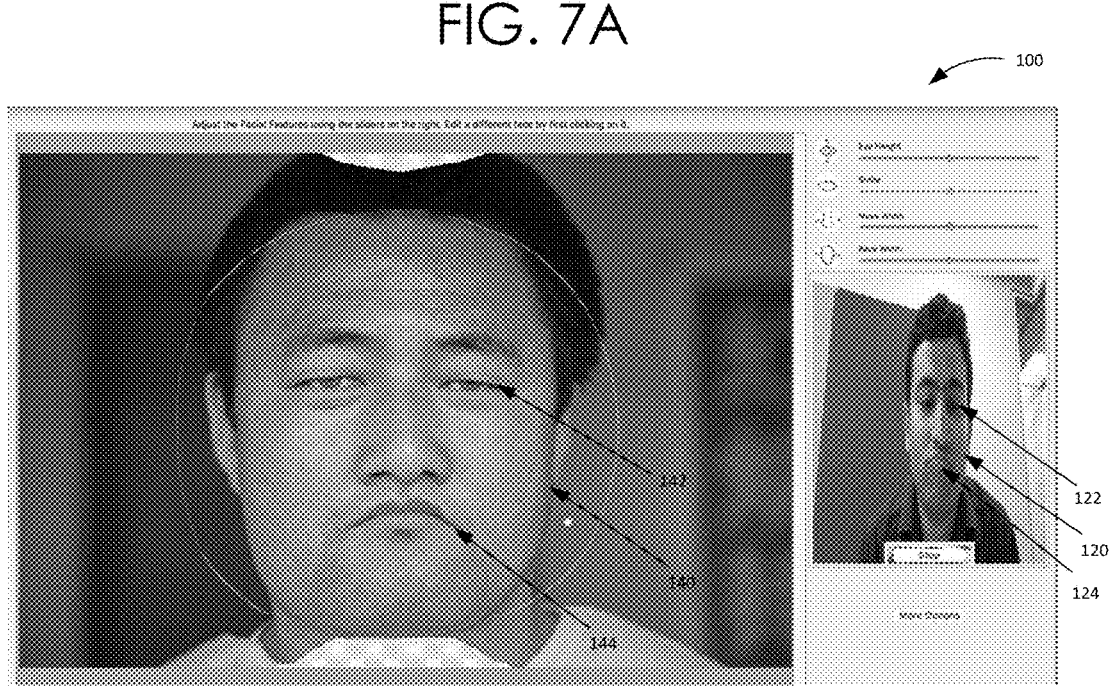
FIG. 7B illustrates the user interface of FIG. 1A, wherein the facial expression of the target subject has been edited to include a frown based on current preview image data depicting the preview subject frowning.
Figure 8A:
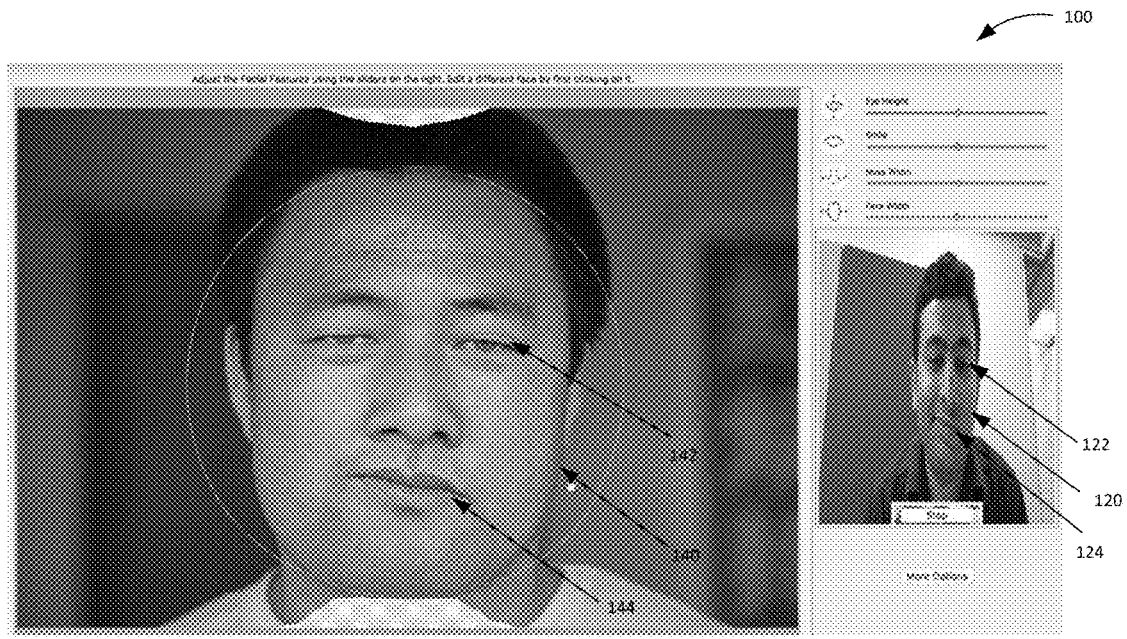
FIG. 8A illustrates the user interface of FIG. 1A, wherein the facial expression of the target subject has been edited to include a distorted shape of the mouth based on current preview image data depicting the preview subject distorting the shape of their mouth.
Figure 8B:
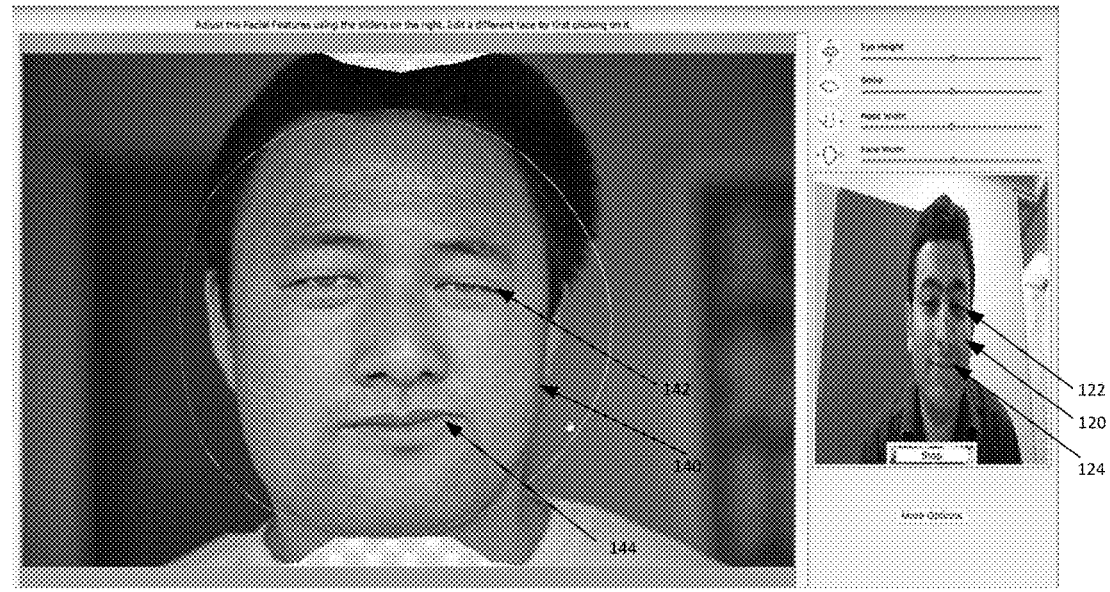
FIG. 8B illustrates the user interface of FIG. 1A, wherein the facial expression of the target subject has been edited to include another distorted shape of the mouth based on current preview image data depicting the preview subject distorting the shape of their mouth.

FIG. 7A illustrates the user interface 100 of FIG. 1A, wherein the facial expression of the target subject 140 has been edited to include widely opened eyes 144 based on current preview image data depicting the preview subject 120 widely opening their eyes 122. FIG. 7B illustrates the user interface 100 of FIG. 1A, wherein the facial expression of the target subject 140 has been edited to include a frown based on current preview image data depicting the preview subject 120 frowning. FIG. 8A illustrates the user interface 100 of FIG. 1A, wherein the facial expression of the target subject 140 has been edited to include a distorted shape of the mouth 144 based on current preview image data depicting the preview subject 120 distorting the shape of their mouth 124. FIG. 8B illustrates the user interface 100 of FIG. 1A, wherein the facial expression of the target subject 140 has been edited to include another distorted shape of the mouth 144 based on current preview image data depicting the preview subject 120 distorting the shape of their mouth 124.

As shown in FIGS. 1A-1B and 7A-8B, the preview subject may automatically edit the facial expressions of a target subject by controlling their own facial expression, via the various embodiments discussed herein. Furthermore, the preview subject (and other users) may view (in real time)m via UI 100, the effect that their facial distortions/variations have on the edited target face. As demonstrated in FIGS. 1A-1B and 7A-8B, each of the multiple dimensions of the preview subject's facial distortions/alterations is realistically (and automatically) simulated in the edited target face and in real time.

Accordingly, the preview subject is enabled to simultaneously edit multiple features of a target face in an intuitive, realistic, and composite manner by distorting/altering their own facial features. Such a face-editing engine does not require a user to independently (and/or manually) edit each individual facial feature of the target face. As discussed below, at least because the face models are generated based on image data of each of the preview and target subjects' face, the models realistically and accurately model/simulate, with a high degree of fidelity, the entirety of the subjects' facial expressions. That is to say, as shown in FIGS. 1A-1B and 7A-8B, that the entirety of the target face is automatically (and simultaneously) editable based on the entirety of the preview face. Therefore, the editing process is not limited to a finite set of facial features, such as the eyes, nose, and mouth. Since the editing process is based on actual image data of the subjects, the editing capability is not limited to the finite features, dimensions, and other constraints associated with traditional face editing tools.

Furthermore, at least because the editing process is based on a difference of a least two data frames of the preview subject, the editing process enables a diverse range of editing capabilities. For instance, if the preview subject desires to exaggerate the width of the opening of the target's eyes, the user may close their eyes for the capturing of the reference preview image data. Thus, when the preview subject open their eyes up wide during the capture of the current preview image data, the difference between the reference and the current preview frames is significant. Note that the target's eyes are at least partially open in the unedited target image data (as shown in FIG. 1A). When such a significant difference between the current and reference subject image data is applied to the target image data (where the target's eyes are already open), the updated target image day will include open eyes, wherein the width of the open eyes is greatly exaggerated.

To apply additional edits, or distortions/alterations, to the target face, the UI provides multiple manual controls for the editing process. For instance, when the preview subject (or another user) desires to apply exaggerated effects, or distortion/alternations, that are not easily accomplished via controlling their own facial expressions, the user may employ the manual controls. As shown in FIGS. 1A-1B, UI 100 includes eye height slider control 102, smile slider control 104, nose width slider control 106, and face width slider control 108. Such slider controls may be employed to update the face model for the target face, to further edit the target image data. It should be noted that additional and/or alternative manual controls for the facial editing may be included in UI 100.

Thus, the face-editing engine enables a real-time composite editing process and workflow based on a live camera feed of the preview subject. The editing process may be completely automated based on the preview subject altering their facial expression, or may be augmented by one or more manual controls. The editing process is intuitive (and hands free, except for start/stop button 110 and manual controls 102-108) for the preview subject, while providing real time feedback of the results.

The editing process may be employed to edit a single, still image of a target subject or may be employed to edit multiple data frames of the target subject. For instance, the facial expressions of a digital character, in the context of a video game, movie, VR/AR scene, or the like may be edited across the entirety of the relevant data frames of the game/movie/scene.

Furthermore, since the editing process employs the capture of the preview subject distorting/altering their facial expression, the process is ideally suited for actors to create or enhance such digital characters. At least because an actor is often an expert at conveying emotions and moods through their facial expressions, the various embodiments of the editing process discussed herein, significantly enhances the ability to convey a wide range of emotions and moods of a digital character.

Although the preview subject shown in FIGS. 1A-1B and 7A-8B is a real-life individual, similar to the target subject, other embodiments are not so constrained and the preview subject may be a digital character. For instance, a digital character may be employed to edit another digital character in at least one embodiment.

Example Environment

Figure 2:
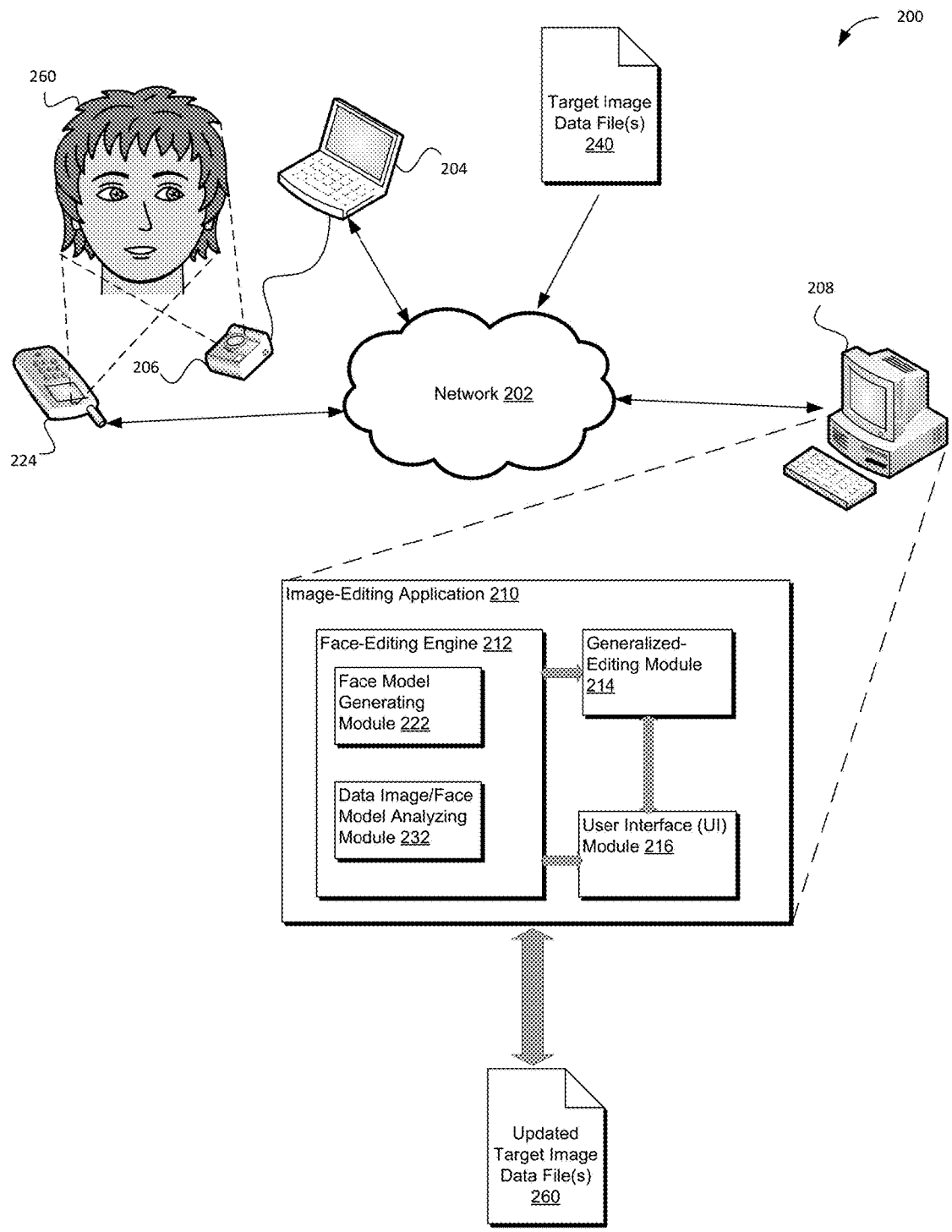
FIG. 2 depicts a system implementing various embodiments presented herein.

FIG. 2 depicts a system 200 implementing various embodiments presented herein. One or more components included in system 200 may be employed to practice any of the various methods or processes discussed herein, including but not limited to at least portions of processes 400-580 of FIGS. 4A-5D. In one exemplary, but non-limiting embodiment, system 200 includes one or more computer devices. Such computer devices may include, but are not limited to, at least one of host computer 208, preview computer 204, and/or mobile computer 224. Any of host computer 208, preview computer 204, or mobile computer 224, may be a physical computer device, a virtual machine, or any combination thereof. It should be noted that any or processes 400-580 may be performed by any one of, or any combination of, host computer 208, preview computer 204, and/or mobile computer 224.

System 200 also includes a generalized communication network 202. Network 202 communicatively couples host computer 208, preview computer 204, and/or mobile computer 224. Network 202 may be any communication network, including virtually any wired and/or wireless communication technologies, wired and/or wireless communication protocols, and the like. In various embodiments, network 202 includes a combination of wireless and wired communication technologies. It should be understood that network 202 may be virtually any network that communicatively couples a plurality of computer devices.

Host computer 208 may host one or more image-editing applications, such as but not limited to image editing application 210. At least one of host computer 208, preview computer 204, and/or mobile computer 224 may be employed to provide image data of the preview face 260 to the image-editing application 210. Network 102 may or may not be employed when providing the preview image data to the image editing application 210.

In at least one embodiment, one or more camera devices, such as but not limited to camera device 206 is employed to capture the image data of the preview face 206. As shown, camera device 206 is communicatively coupled (via wired and/or wireless technologies) to preview computer 204. In such an embodiment, preview computer 204 provides the preview image data, via network 202, to the image-editing application 210. In some embodiments, a camera device includes one or more image sensor devices.

In other embodiments, one or more camera devices included and/or embedded within mobile computer 224 is employed to capture the preview image data, as well as providing the preview image data to the image-editing application 210. For instance, mobile computer 224 may be a smartphone, tablet, camera-enabled wearable device, or the like.

In at least one embodiment, the target image data is provided to the image-editing application 210 via one or data files, including but not limited to target image data file(s) 240. In other embodiments, the target image data is captured by and provided by one or more camera devices. Virtually any computer and/or camera device may provide the target image data to the image-editing application 210. A network, such as but not limited to network 102, may or may not be employed when providing the target image data to the image-editing application 210.

At least one of host computer 208, preview computer 204, and/or mobile computer 224 may display one or more user interfaces (UIs) of the image-editor application 210, such as, but not limited to UI 100 of FIGS. 1A-1B. As such, a preview subject (or another user) may employ at least host computer 208, preview computer 204, and/or mobile device 224 to edit a target face, via one or more of the various embodiments discussed herein.

In one embodiment, host computer 208 may be a server device, and at least one of preview device 204 and/or mobile device 224 may be a client device. In such embodiments, image-editing application 210 may be a server application, and at least one of the preview computer 204 and/or the mobile computer 224 may host a corresponding client application. In conjunction with the server application, the one or more client applications may enable the capture and providing of the preview and/or target image data, as well as displaying the one or more UIs. Accordingly, a user of a client device may review the editing of the target image data based on the preview image data. Thus, a client/server architecture may be employed within system 200.

In other embodiments, a single computer device may provide each of the functionality associated with the various embodiments discussed herein, e.g. the editing process enabled by system 200 may be implemented by a single (physical, virtual, or combination thereof) machine, such as but not limited to any one of host computer 208, preview computer 204, and/or mobile computer 224, or virtually any other computer device and/or networked camera device. A non-limiting exemplary embodiment of such a computer device is discussed in conjunction with at least FIG. 9.

The block in FIG. 2 representing image-editing application 210 shows one exemplary, but non-limiting schematic architecture for an application that enables the various embodiments discussed herein. At least portions of image-editing application 210 may be instantiated as computer-readable instructions for editing image data of a target face. The instructions may be stored on one or more non-transitory computer-readable storage media. When the instructions are executed by one or more processors of one or more computers (real or virtual machines) actions are performed. Such actions may enable at least portions of the various processes and/or methods discussed herein, such as but not limited to processes 400-580 of FIGS. 4A-5D. For instance, at least one processor device included in at least one of host computer 208, preview computer 204, and/or mobile computer 224 may provide one or more of the various embodiments of a face-editing engine discussed herein.

Image-editing application 210 may include at least one of a face-editing engine 212, a generalized-editing module 214, and/or a user interface (UI) module 216. The face-editing engine 212 enables any of the various face-editing processes discussed herein, such as but not limited to at least portions of processes 400-580 of FIGS. 4A-5D.

In various embodiments, face-editing engine 212 is implemented via one or more modules, such as but not limited to face model generating module 222 and/or data image/face model analyzing module 232. Face model generating module 222 may generate one or more of the various face models discussed herein. In at least one embodiment, image data is provided to the face model generating module 222. Module 222 generates one or more face models based on the provided image data. Data image/face model analyzing module 232 may analyze the image data to update the various face models. In at least one embodiment, module 232 may analyze and/or compare face models to update the models and/or update the image data based on the updated face models.

Various embodiments of the image-editing application 210 include a generalized-editing module 214, which enables the editing of features other than the target's face included in the target image data. Image-editing application 210 also includes a UI module 216, which may generate, manage, and/or control one or more UIs, such as but not limited to UI 100 of FIGS. 1A-1B. In some embodiments, UI module 216 may enable the display of one or more UIs on virtually any networked computer device, including but not limited to at least one of host computer 208, preview computer, and/or mobile computer 224. The image-editing application 210 can provide the updated target image data in the form of one or more data files, such as but not limited to updated target image data file(s) 260 to virtually any computer device, via generalized communication network 102. In at least one embodiment, a network is not required to provide the updated target image data.

Face Models

The various embodiments discussed herein include generating face models, updating face models, and updating image data. At least in the context of processes 400-580 of FIGS. 4A-5D, the various embodiments include generating face models based on image data, updating face models based on image data, and updating image data based on updated face models. It should be understood that the various embodiments are consistent with and may employ any generalized face model. For instance, any data model, data structure, data object, or structured or unstructured data that models, simulates, reproduces, approximates, or is otherwise dependent upon or based on one or more facial features included, embedded, encoded, or otherwise depicted within image data may be employed by the various embodiments as a face model.

Furthermore, consistent with the various embodiments, virtually any method, process, algorithm, or the like may be employed to generate one or more face models based on image data. Likewise, virtually any method, process, algorithm, or the like may be employed to update one or more face models based on image data. In the various embodiments, image data may be generated and/or updated based on face models and/or updated face models via virtually any method, process, algorithm, or the like.

In at least some embodiments, a face model may include a face mesh based on a face represented or depicted by image data. A face model may include a plurality of landmark points. The landmark points may or may not be grouped based on the facial features depicted in, or represented by the image data. In some embodiments, the face model includes deformation fields. The deformation fields may be deformable and/or warpable by the plurality of landmark points. Thus, a face model may include a plurality of warpable elements defined to the respective deformation fields. The deformation fields may include the warpable elements, which are formed by the landmark points.

More particularly, landmark points may be spatial points (or approximations of physical points). Each landmark point in the model corresponds to a point, pixel, location, index, address, or the like included in the image data. Although the various embodiments discussed herein include two-dimensional (2D) image data, other embodiments are not so constrained. For instance, it should be understood that at least some of the various embodiments discussed herein may be extended to three-dimensional (3D) image data, such as in the context of VR, AR, or other such applications. One or more landmark points may corresponds to facial features, regions, areas, or locations within the face of the image data.

Each landmark point may include one or more coordinates. For instance, in a 2D face model, each landmark point may include two coordinates to designate the location of the point within the model. In at least one embodiment, the coordinates may be Cartesian coordinates, indicated by the standard (x, y) notation. Other embodiments are not so constrained, and any suitable coordinate system, such as polar coordinates, may be employed in the model.

Figure 3:
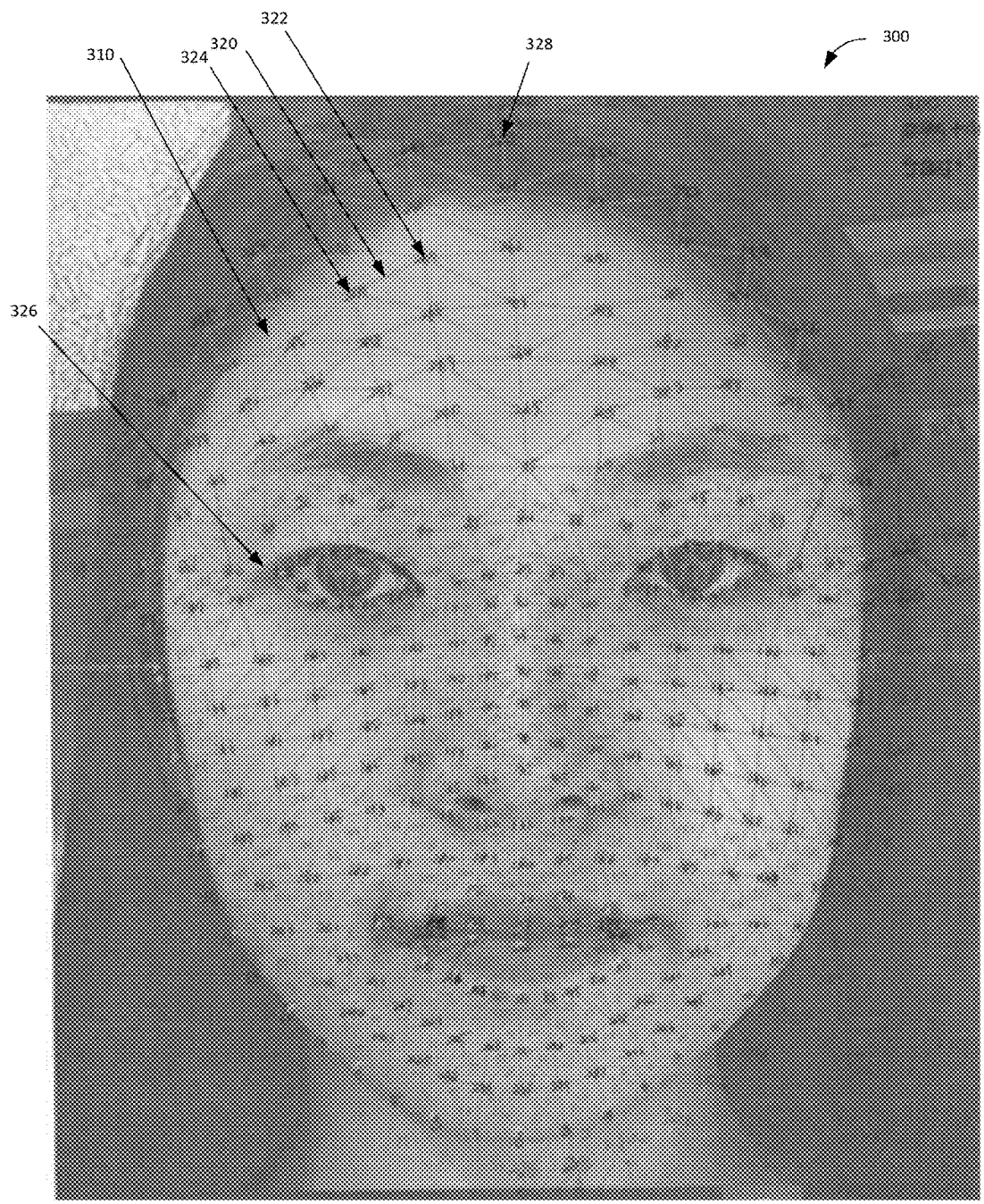
FIG. 3 shows an exemplary, but non-limiting embodiment of a face model based on image data that includes the face of a subject.

FIG. 3 shows an exemplary, but non-limiting embodiment of a face model 300 based on image data that includes the face of a subject. The subject may be a target subject or a preview subject. Thus, face model 300 may be target face model or a preview face model. More specifically, exemplary face model 300 is a mesh face model based on the image data displayed in FIG. 3. Face model 300 includes a plurality of landmark points, such as landmark points 322 and 324. In the embodiment shown in FIG. 3, face model 300 includes N=300 landmark points. However, it should be noted that other embodiments are not so constrained. That is to say that more or less landmark points may be included in other embodiments. N may take on virtually any integer value greater than 2.

Face model 300 includes a plurality of warpable elements, such as warpable element 320. Warpable elements may extend between paired landmark points. The paired landmark points may be adjacent, neighboring, or in close proximity. For instance, warpable element 320 extends between adjacent landmark points 322 and 324. Thus, warpable element 320 is a warpable vector. A plurality of warpable elements may be included in a deformation field, such as deformation field 326.

As discussed throughout, each landmark point may include one or more coordinates. In 2D face model 300, each landmark point includes two coordinates to designate the location of the point within the model. The coordinates for each landmark point may be Cartesian coordinates, indicated by the standard (x, y) notation. The origin of such a Cartesian (or other) coordinate system may be placed virtually anywhere within the image data. In the embodiment shown in FIG. 300, the origin of the coordinate system is placed at the top center of the face, at landmark point 328. Thus, in at least one embodiment, the Cartesian coordinates for landmark point 328 is (0, 0). In other embodiments, the origin of the coordinate system for the face model is placed elsewhere within the image data.

U.S. patent application Ser. No. 14/938,673 (the '673 application), entitled "FACIAL FEATURE LIQUIFYING USING FACE MESH," filed on Nov. 11, 2015, the contents of which are incorporated herein in the entirety, discusses various embodiments of face models. It should be noted that any of the face models discussed in the '673 application may be employed in the various embodiments herein. It should also be noted that other face models, not discussed in the '673 application, may additionally and/or alternatively be employed in the various embodiments herein.

More specifically, the '673 application discusses various embodiments for generating face models based on image data, updating face models based on image data, and updating image data based on face models. Accordingly, and as noted throughout, any of the embodiments discussed in the '673 application may be employed by or implemented within any of the various embodiments discussed herein, including, but not limited to system 200 of FIG. 2 and at least portions of processes 400-580 of FIGS. 4A-5D. As such, the face-editing engine 212 of FIG. 2 may include one or more additional modules and/or sub-modules, such as but not limited to one or more face mesh generators, one or more deformation field generators, and the like, as discussed within the '673 application. Such modules may be included in, or employed in conjunction with the various modules included a face-editing application.

According, the '673 application discusses various steps for generating target models (models for a target face) and/or references models (models for a preview face). Furthermore, the '673 application discussed various steps for updating image data a face model, such as but not limited to a current model of the preview face, based on image data of the preview face. The '673 application also discusses various steps for updating image data of the target face based on the target model.

Generalized Processes for Editing the Face of a Subject Depicted within Image Data Processes 400-580 of FIGS. 4A-5D will now be discussed. Briefly, processes 400-580, either singly or in combination, may be employed to edit a face of a target subject depicted within image data. Processes 400-580 will be discussed in conjunction with at least UI 100 of FIGS. 1A-1B and 7A-8B, system 200 of FIG. 2, and face model 300 of FIG. 3. Furthermore, processes 400-580 will be discussed in conjunction pseudo-code 600 of FIG. 6. FIG. 6 depicts exemplary pseudo-code of various embodiments for updating face models based on image data that is consistent with the various embodiments presented herein.

The various embodiments of processes and/or methods, as described in at least conjunction with processes 400-580 may be at least partially implemented by one or more image-editing applications and/or face-editing engines. Thus, processes 400-580, or at least portions thereof, may be implemented by one or more engines, such as but not limited to face-editing engine 220 of FIG. 2. Furthermore, these processes, or at least portions thereof, may be performed by or executed on virtually any computer device (real or virtual machines) or virtually any combination of computer devices, including but not limited to host computer 208, preview computer 204, and/or mobile computer 224 of system 200 of FIG. 2.

Figure 4A:
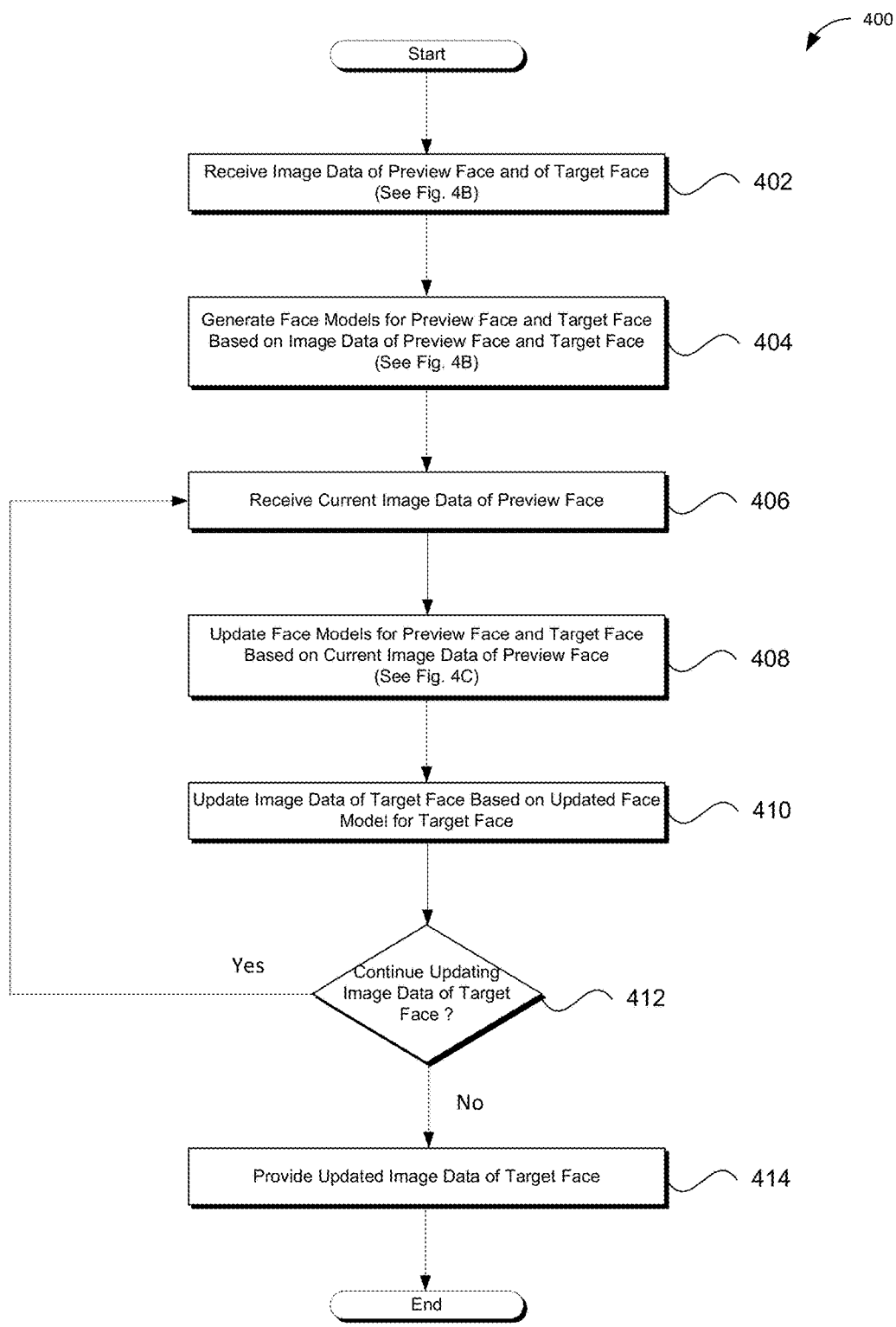
FIG. 4A illustrates one embodiment of a process flow for editing the face of a target subject depicted within image data that is consistent with the various embodiments presented herein.

FIG. 4A illustrates one embodiment of a process flow for editing the face of a target subject depicted within image data that is consistent with the various embodiments presented herein. Process 400 begins, after a start block, at block 402, where image data of a preview face is received. Furthermore, image data of a target face is received at block 402. Various embodiments of receiving image data of the preview face and target face are discussed in conjunction with at least process 420 of FIG. 4B. However, briefly, the image data of both of the preview face and the target face may be received by virtually any means, such as over a wired and/or wireless network and/or via one or more data files.

The image data of the preview face may be preview image data that depicts or includes a representation of the preview face, i.e. the face of the preview subject. In at least one embodiment, the image data of the preview face is captured by one or more camera devices. The image data of the preview face may be video data that includes a plurality of image data frames. The image data of the preview face received at block 402 may be reference image data of the preview face. The reference image data of the preview face depicts or includes a representation of a reference, or initial, facial expression of the preview subject. The reference image data of the preview face may include a single image data frame. In at least one embodiment, the reference image data of the preview face is captured by one or more camera devices when a user, such as but not limited to the preview subject, initiates the capturing of the preview image data. For instance, the preview subject may initiate capturing the reference image data via a control on a user interface, such as but not limited to start/stop button 110 of UI 100 of FIG. 1A.

The image data of the target face may be target image data that depicts or includes a representation of the target face, i.e. the face of the target subject. The image data of the target face received at block 402 may be reference and/or unedited image data of the target face. Accordingly, the image data of the target face received at block 402 depicts a reference, initial, and/or unedited facial expression of the target subject. The image data of the target face may include a single image data frame. In at least one embodiment, the image data of the target face is captured by one or more camera devices. The image data of the target face may be video data that includes a plurality of image data frames. In at least one embodiment, the image data of the target face includes one or more image data frames provides via one or more image data files. Preview display window 112 of FIG. 1A shows reference image data of the preview face. Likewise, target display window 114 of FIG. 1A shows unedited or reference image data of the target face.

At block 404, a face model for the preview face is generated based on the image data of the preview face. The face model for the preview face models the reference or initial facial expression of the preview subject, as depicted or represented within the image data of the preview face received at block 402. Furthermore, at block 404, a face model for the target face, that is separate from the face model for the preview face, is generated based on the image data for the target face. The face model for the target face models the reference, initial, and/or unedited facial expression of the target subject, as depicted or represented within the image data of the target face received at block 402.

Figure 4B:
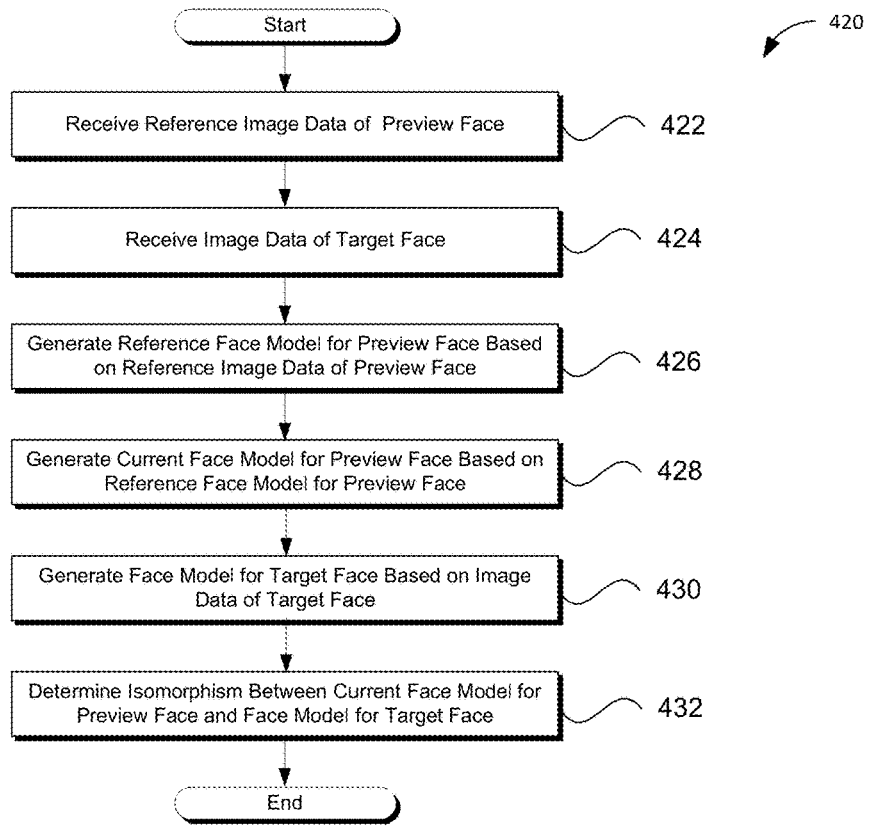
FIG. 4B illustrates one embodiment of a process flow for generating face models based on image data that is consistent with the various embodiments presented herein.
Figure 5A:
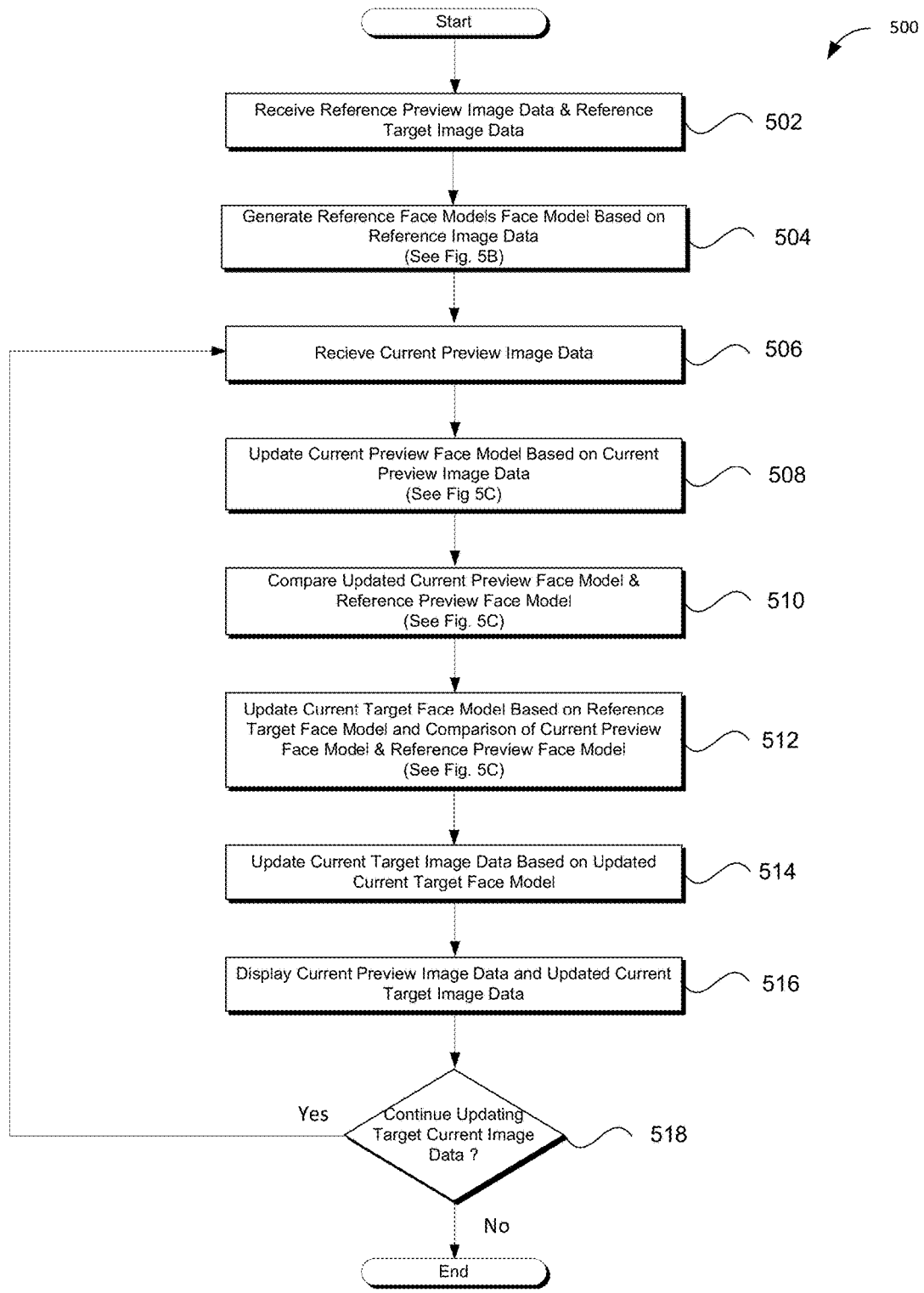
FIG. 5A illustrates another embodiment of a process flow for editing the face of a target subject depicted within image data that is consistent with the various embodiments presented herein.
Figure 5B:
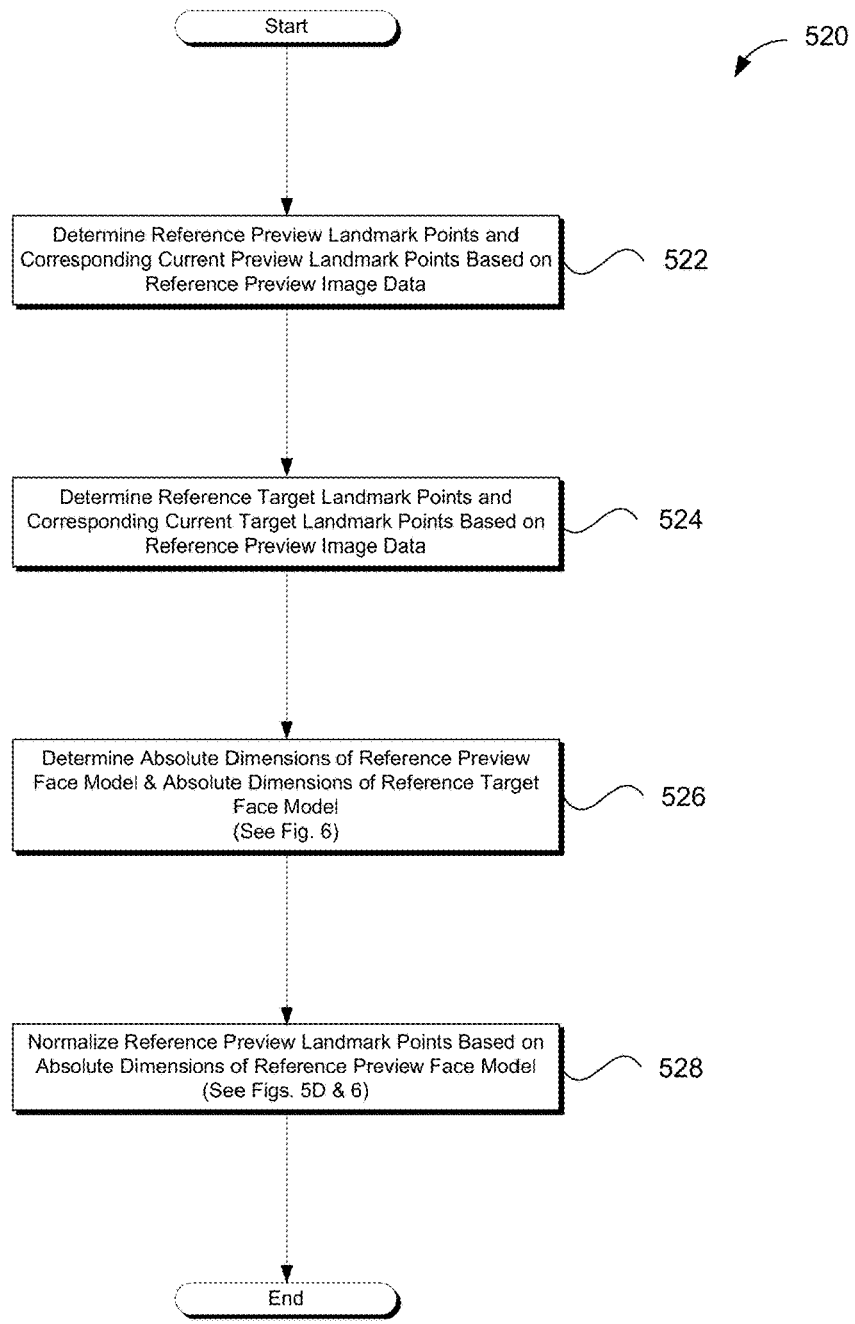
FIG. 5B illustrates another embodiment of a process flow for generating face models based on image data that is consistent with the various embodiments presented herein.

Various embodiments of generating face models for the preview and target faces are discussed in conjunction with at least process 420 of FIG. 4B. However, briefly, each of the face models may be a mesh face model. However, other embodiments are not so constrained and the type of face model is not constrained. Any of various embodiments discussed in the '673 application may be employed to generate each of the face models based on the image data.

In at least one embodiment, a reference face model of the preview face is generated based on the reference image data of the preview face. In some embodiments, a current face model for the preview face may be generated based on the reference image data and/or the reference face model. For instance, at block 404, the current face model for the preview face may be equivalent to the reference model for the preview face. The current face model for the preview face may be generated by generating one or more copies of the reference face model for the preview face.

Furthermore, an isomorphism between the reference/current models for the preview face and the face model for the target face may be determined at block 404. For instance, each face model may include the same number of landmark points N, where N is a positive integer. A one-to-one mapping or correspondence between each of the N landmark points of the face models for the preview face and each of the N landmark points of the face model for the target face may be determined at block 404.

At block 406, current image data of the preview face is received. The current image data depicts or includes a representation of a current, updated, or altered (as compared to the reference), facial expression of the preview subject. Similar to the reference image data of the preview face, the current image data of the preview face may be received via virtually any mechanism that provides, transmits, and/or receives digital data, e.g. over a wired/wireless network, one or more data files, streamed, or the like. Briefly, one or more camera devices may capture another data image frame of the preview face. The camera device may provide this current image data of the preview face at block 406. Each of the corresponding preview display windows in UI 100 in FIGS. 1B and 7A-8B show received current image data of the preview face captured by a live camera feed.

The current image data of the preview face may be the next or consecutive data frame in video image data of the preview face. That is to say, in some embodiments, the reference data frame and the current data frame are temporally contiguous frames. In other embodiments, one or more frames of image data may be temporally positioned intermediate the reference image data frame and the current image data frame of the image data of the preview face. In some embodiments, the reference and current data frames are discrete frames of image data, i.e. they are not included in video image data.

In some embodiments, the reference and the current frames are provided via a live camera feed, i.e. at block 406, one or more camera devices capture the current image data of the preview face in real time. Such embodiments may be referred to as real time editing embodiments. In other embodiments, at least one of the reference and current image data frames of the preview face were previously captured via a camera device, i.e. prior to the initialization of process 400. In such embodiments, the editing process is not in real time and/or a temporal gap exists in the acquisition of the image data of the preview face and the editing of the target face.

At block 408, the face model for the target face is updated based on the current image data for the preview face. At least one or more portions of the face model for the target face are updated to model at least variations between the current and/or updated facial expression of the preview subject, as depicted or represented in the current image data of the preview face (received at block 406) and the reference and/or initial facial expression of the preview subject, depicted or represented in the image data of the preview face (received at block 402).

Figure 4C:
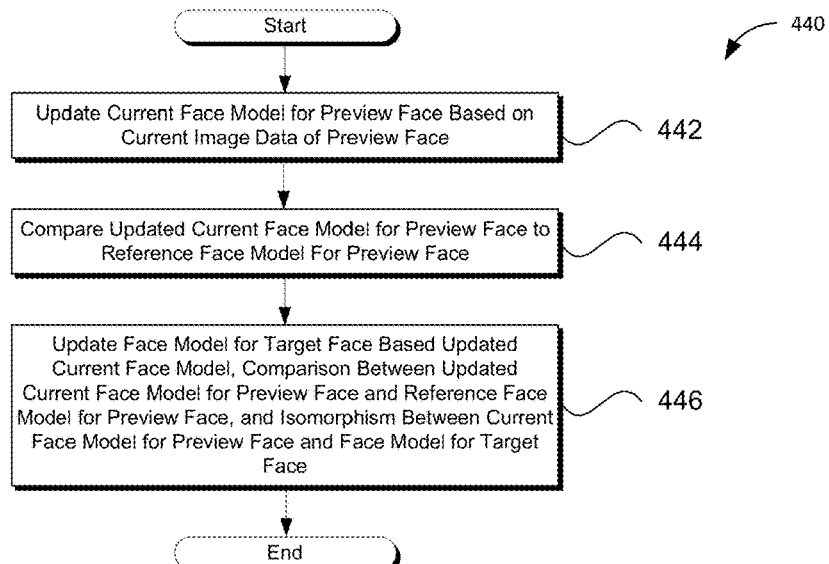
FIG. 4C illustrates one embodiment of a process flow for updating face models based on image data that is consistent with the various embodiments presented herein.
Figure 5C:
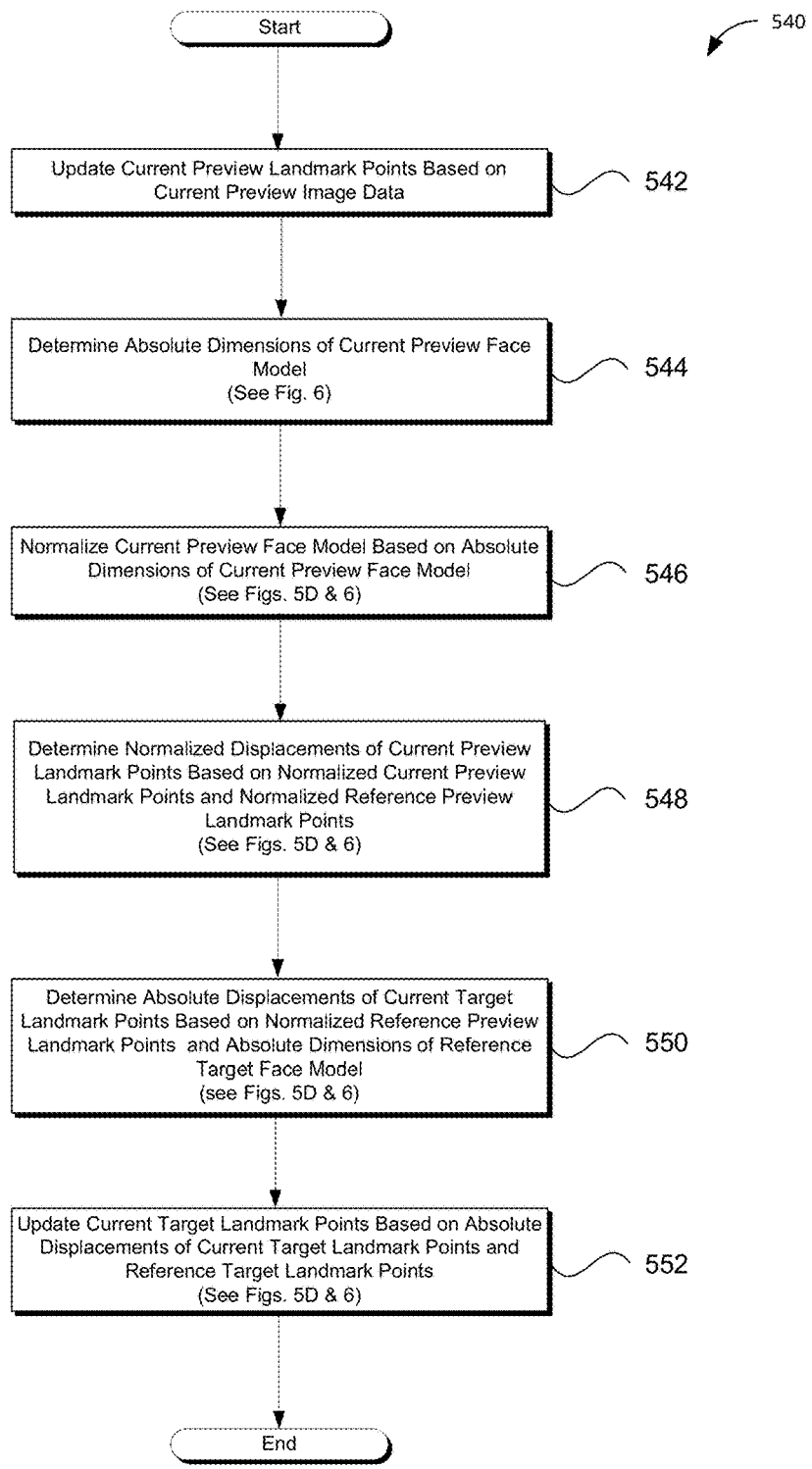
FIG. 5C illustrates another embodiment of a process flow for updating face models based on image data that is consistent with the various embodiments presented herein.
Figure 6:
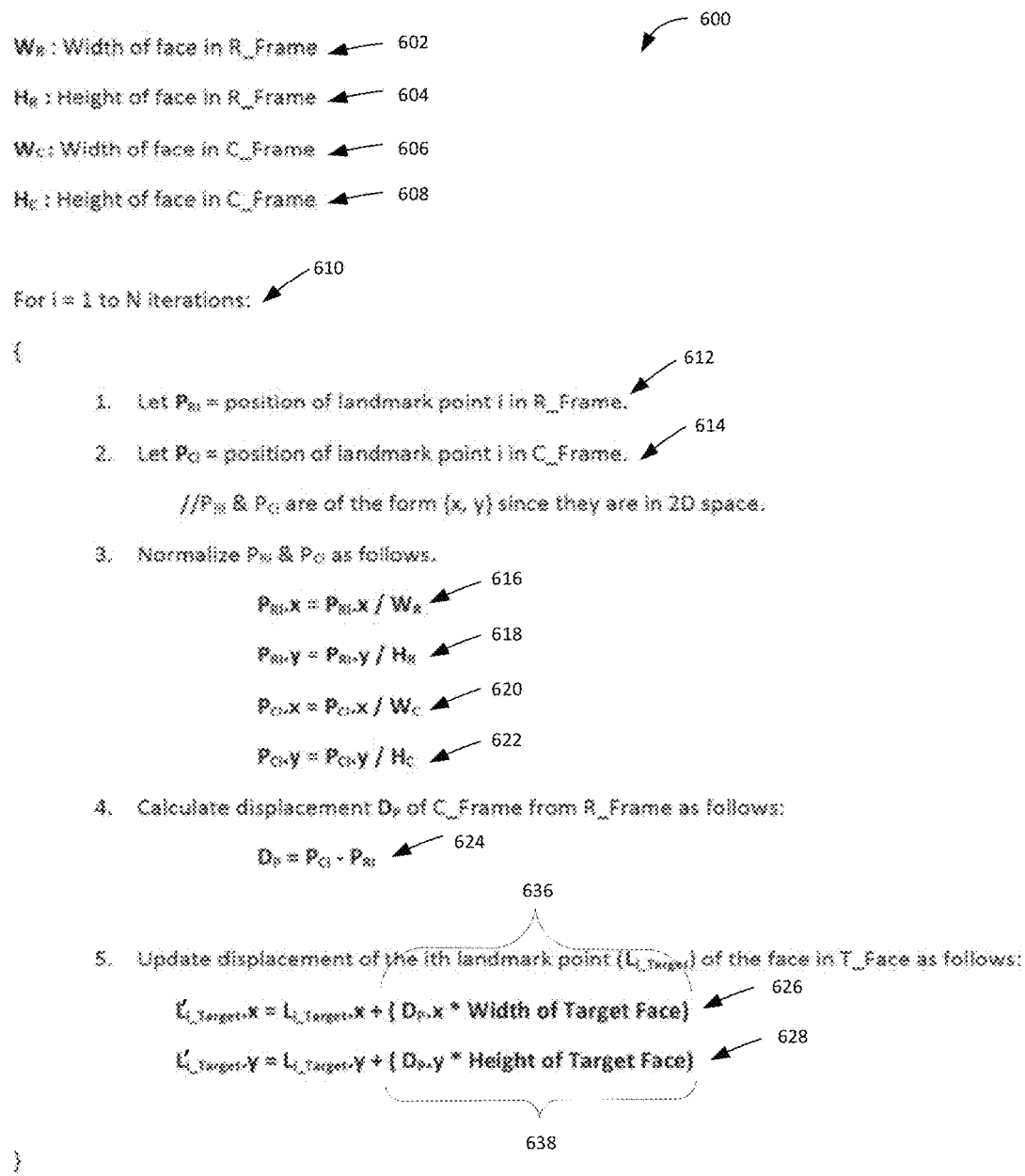
FIG. 6 depicts exemplary pseudo-code of various embodiments for updating face models based on image data that is consistent with the various embodiments presented herein.

Various embodiments of updating the face model for the target face are discussed in conjunction with at least processes 440, 560, and 580 of FIGS. 4C, 5C, and 5C respectively, as well pseudo-code 600 of FIG. 6. However, briefly here, in at least some embodiments, at block 408, the current face model for the preview face is updated based on the current image data of the preview face. For instance, the current face model for the preview face may be updated to model the current, updated, or altered (as compared to the reference), facial expression of the preview subject, as depicted or represented within the current image data of the preview face received at block 406.

More specifically, updating the face model for the target face is based on the updated current face model of the preview face. In some embodiments, the updated current face model for the preview face is compared to the reference face model for the preview face based on an isomorphism between the current and reference face models for the preview face. Thus, in some embodiments, the face model for the target face is updated based on one or more differences and/or variations determined in the comparisons between the updated current and reference face models for the preview face.

Essentially, at block 408, at least one or more portions of the face model for the target face are updated to model at least any variations between the current image data of the preview face and the reference image data of the preview face. Any of various embodiments discussed in the '673 application may be employed to update face models based on image data at block 408. However, other embodiments are not so constrained, and virtually any method of updating face models based on image data may be employed.

In at least one embodiment, the preview subject (or another user) may provide one or more scaling parameters. The comparison between the update model for the preview face and the reference face model may be scales based on the one or more scaling parameters. As such, the scaling parameters may be employed to further control and/or adjust the editing process.

At block 410, the image data of the target face is updated based on the updated face model for the target. At least one or more portions of the image data of the target face are updated to depict or include representations of the variations in the preview face that are modeled in the updated face model for the target face. More specifically, the updated image data of the target depicts the variations between the current and/or updated facial expression of the preview subject, as depicted or represented in the current image data of the preview face and the reference and/or initial facial expression of the preview subject, depicted or represented in the image data of the preview face. Thus, the image data of the target face is edited to accurately depict and/or represent the variations, alterations, and/or distortions between the current facial expression and the reference facial expression of the preview subject.

In some embodiments, the updated image data for the target face may be displayed. For instance, each of the corresponding target display windows in UI 100 in FIGS. 1B and 7A-8B shows updated image data for the target face. Note the correspondence and/or correlations between the varied features of the facial expression of the preview subject and the edited and/or updated features of the facial expression of the target subject.

Any of various embodiments discussed in the '673 application may be employed to update image data based on face models at block 410. However, other embodiments are not so constrained, and virtually any method of updating image data based on one or more updated face models may be employed.

In some embodiments, a current image data for the target face is generated and or updated at block 410. For instance, the reference image data for the target face may remain unedited. In such embodiments, a new data frame for the target face is generated at block 410. In such embodiments, video image data of the edited target face may be generated.

At decision block 412, it is determined whether to continue updating the image data of the target face. For instance, the editing process may continue until the preview subject terminates the process via the start/stop button of UI 100. If the preview subject (or another user) terminates the editing process, process 400 continues to block 414. Otherwise, process 400 returns to block 406 to receive a next frame of image data for the current image data of the preview face.

For instance, process 400 may return to block 406, where a camera device captures and provides another data frame, as the next current image data of the preview face. In some embodiment, the next current image data of the preview face will be the next frame within a stream of video image data of the preview face. In other embodiment, the next current image data of the preview face is not the next frame, e.g. process 400 processes only a subset of frames within the video stream. For example, in such embodiments, process 400 employs a predetermined and/or randomized sampling frequency of the frame of the video stream.

At block 414, the updated image data of the target face is provided. For instance, the updated image data may be provided in one or more data files, over a network, to a printing device, or the like. Process 400 terminates or may return a calling process.

FIG. 4B illustrates one embodiment of a process flow for generating face models based on image data that is consistent with the various embodiments presented herein. According, process 420 of FIG. 4B includes various steps for generating target models (models for a target face) and/or references models (models for a preview face). Process 420 begins, after a start, at block 422 where the reference image data of the preview face is received. At block 422, a camera device may capture and provide the reference image of the preview face.

At block 424, the image data of the target face is received. The image data at block 424 may be reference image data for the target face. As noted throughout, virtually any mechanism that provides, transmits, and/or receives digital data, e.g. over a wired/wireless network, one or more data files, streamed, or the like, may be employed to receive the image data at both blocks 422 and 424.

At block 426, a reference face model for the preview face is generated based on the reference image data of the preview face. The generated reference face model for the preview face may be a mesh face model. In some embodiments, the reference face model for the preview face may include N landmark points, where N is a positive integer greater than 2. N may take on virtually any integer greater than 2. Generally speaking, the larger N, the greater the fidelilty of the editing process. That is, greater N typically results in a greater correspondence between the variations in the preview face and the edited features of the target face. In some embodiments, N is approximately 300. Other embodiments are not so constrained, e.g. the type of face model is not constrained. For instance, any of various embodiments discussed in the '673 application may be employed to generate the reference face model for the preview face. FIG. 3 shows an exemplary, but non-limiting, embodiment of a generated face model 300 for a face of a subject that is based on image data depicting the face.

At block 428, a current face model for the preview face is generated. In some embodiments, the current face model for the preview face is based on the reference face model for the preview face. In at least one embodiment, the current face model is a copy of the reference face model. Accordingly, each of the current and reference face models for the preview face includes N landmark points. There may be one-to-one correspondence between the N landmark points of the reference face model and the current face model.

At block 430, a face model for the target face is generated based on the image data of the target face. Similar to block 426, virtually any method for generating a face model for the target face may be employed at block 420 and the type of the face model is unconstrained in the various embodiments. For instance, any of various embodiments discussed in the '673 application may be employed to generate the face model for the preview face. In some embodiments, the face model for the target face include N landmark points, such that each of the reference face model for the preview face, the current face model for the preview face, and the face model for the target face each include N landmark points.

At block 432, an isomorphism between the current face model for the preview face and the face model for the target face is determined. In at least one embodiment, the isomorphism determined at block 432 is additionally between reference face model for the preview face and the current face model for the preview face. For instance, a one-to-one mapping and/or correspondence between each of the N landmark points of the current face model of the preview face and each of the N landmark points of the face model for the target face is determined. Furthermore, a one-to-one mapping, correlation, association, and/or correspondence between each of the N landmark points of the current face model of the preview face and each of the N landmark points of the reference face model for the preview face may be determined.

The one-to-one mapping may indicate a correlation between the facial features, areas, or regions modeled by the correlated or paired landmark points in each of the models. For example, a landmark point indicating the tip of the nose included in the current face model for the preview face may be paired with, mapped to, associated with, or otherwise correlated with a corresponding landmark point indicating the tip of the nose included in each of the reference face model for the preview face and the face model for the target face. Process 420 may terminate and/or return a calling process.

FIG. 4C illustrates one embodiment of a process flow for updating face models based on image data that is consistent with the various embodiments presented herein. According, process 440 of FIG. 4C includes various steps for updating target models (models for a target face) based on a comparison of an updated current model for a preview face and a reference model for the preview face. Process 440 begins, after a start block, at block 442 where the current face model for the preview face is updated based on the current image data of the preview face. For instance, the updated face model may be updated to model and/or include the variations in the facial expression of the preview subject between the reference image data and the current image data of the preview face. Any of various embodiments discussed in the '673 application may be employed at block 442 to update the current face model for the preview face.

At block 444, the updated current face model for the preview face is compared to reference face model for the preview face. Various embodiments for comparing the current and reference face models for the preview face are discussed in conjunction with at least processes 560 and 580 of FIGS. 5C and 5D respectively, as well as pseudo-code 600 of FIG. 6. However, briefly, a comparison between the updated current and the reference face models of the preview face is generated at block 444. The comparison may be based on the isomorphism between the current and reference face models. The comparison may generated one or more spatial displacements associated with each of the N landmark points included in the current face model, as compared to the reference face model.

At block 446, that face model for the target face is updated based on the updated current model for the preview face. Various embodiments for updating the face model for the target face based on the updated face model for the preview face are discussed in conjunction with at least processes 560 and 580 of FIGS. 5C and 5D respectively, as well as pseudo-code 600 of FIG. 6. However, briefly, updating the face model for the target face is based on the comparison between the updated current face model for the preview face and the reference face model for the preview face. Updating the face model for the target face may be further based on the isomorphism between the current face model for the preview face and the face model for the target face.

For instance, in some embodiments, one or more spatial displacements associated with each of the N landmark points included in the face model for the target face may be determined based on the one or more spatial displacements associated the corresponding, via the isomorphism, landmark points included in the current face model of the preview face. When updating the face model for the target face, these one or more determined spatial displacements for may be applied the landmark points of the face model for the target face. Process 440 may terminate and/or return a calling process.

FIG. 5A illustrates another embodiment of a process flow for editing the face of a target subject depicted within image data that is consistent with the various embodiments presented herein. Process 500 begins, after a start block, at block 502, where reference preview image data and reference target image data are received. Reference preview image data may be included in, equivalent to, or at least similar to image data for the preview face as discussed throughout. That is to say, similar to the reference image data of the preview face, the reference preview image data depicts or includes a representation of a reference or initial facial expression of the preview subject.

Furthermore, reference target image data may be included in, equivalent to, or at least similar to image data of the target face as discussed throughout. That is to say, the reference target image data depicts a reference, initial, and/or unedited facial expression of the target subject. Thus, various embodiments for receiving reference preview/target image data are discussed throughout, including at least in conjunction with processes 400 and 420 of FIGS. 4A-4B respectively.

At block 504, reference face models are generated based on the reference image data. More specifically, a reference preview face model is generated based on the reference preview image data. Furthermore, a reference target face model is generated based on the reference target face. The reference preview face model models the reference or initial facial expression of the preview subject, as depicted or represented within the reference preview image data. Likewise, the reference current face model models the reference, initial, or unedited facial expression of the target subject, as depicted or represented within the reference target image data.

Various embodiments for generating reference preview/target face models based on the reference preview/target image data are discussed throughout, including at least in conjunction with process 520 of FIG. 5B. However, briefly at block 504, generating a reference preview face model may include at least determining a plurality of reference preview landmark points based on the reference preview image data. Furthermore, generating a reference target face model may include at least determining a plurality of reference target landmark points based on the reference target image data.

In some embodiments, there is an isomorphism between the reference preview and reference target face models. Thus, there may be a correspondence, correlation, and/or a one-to-one mapping between each of the plurality of reference preview landmark points and each of the plurality of reference target landmark points. Any of the embodiments discussed in the context of the '673 application may be employed to determine the reference/current preview face models at block 504. Accordingly, determine the reference face models may include determining the corresponding deformation fields, warpable elements, warpable vectors, or the like In at least one embodiment, a current preview face model may be generated, as well as a current target face model. At block 504, the reference and current preview face models may be equivalent, or at least similar face models. Furthermore, the reference and current target face models may be equivalent, or at least similar face models.

Thus, each reference preview and target face models may be copied, reproduced, and/or replicated to generate the corresponding current preview and target face models. Accordingly, there may be a correspondence, correlation, and/or a one-to-one mapping between each of the landmark points in each of the four face models with each of the landmark points in each of the other three face models. FIG. 3 shows one exemplary, but not limited embodiment of such a face model 300 based on image data that includes a plurality of landmark points.

At block 506, current preview image data is received. In at least one embodiment, current preview image data may be included in, equivalent to, or at least similar to the current image data of the preview face as discussed throughout. Thus, the current preview image data depicts or includes a representation of a current, updated, or altered (as compared to the reference) facial expression of the preview subject.

Various embodiments for receiving current preview image data for the preview face are discussed throughout, including at least in conjunction with process 400 FIG. 4A. For instance, the current preview image data may be captured and/or provided via one or more camera devices or live camera feeds.

At block 508, the current preview face model is updated based on the current preview image data. Various embodiments for updating the current preview face model are discussed in conjunction with at least process 540 of FIG. 5C. However, briefly at block 508, the current preview face model is updated to model the current, updated, or altered (as compared to the reference), facial expression of the preview subject, as depicted or represented within the current preview image data received at block 506. For instance, each of the spatial coordinates of each of the plurality of current preview landmark points may be updated based on the current preview image data.

At block 510, the updated current preview face model is compared to the reference preview face model. Various embodiments for comparing the current and reference preview face models are discussed in conjunction with at least processes 540 and 560 of FIGS. 5C and 5D, as well as pseudo-code 600 of FIG. 6. However, briefly, at block 510, a comparison between the current preview face model and the reference preview face model is generated. The comparison may include one or more absolute and/or normalize displacements for the spatial coordinates of each of the plurality of current preview landmark points based on a comparison of the updated spatial coordinates of the current preview landmark points and the spatial coordinates of corresponding the reference preview landmark points.

At block 512, the current target face model is updated based on the reference target face model and the comparison of the current preview face model and the reference preview face model. Various embodiments for updating the current target face model are discussed in conjunction with at least processes 540 and 560 of FIGS. 5C and 5D, as well as pseudo-code 600 of FIG. 6.

However, briefly, at block 512, the current target face model is updated to model at least the variations between the current and/or updated facial expression of the preview subject, as depicted or represented in the current preview image data and the reference and/or initial facial expression of the preview subject, as depicted or represented in the reference preview image data. In some embodiments, the spatial coordinates of each of the plurality of current target landmark points are updated based on the displacements of the spatial coordinates of the corresponding current preview landmark point.

At block 514, the current target image data is updated based on the updated current target face model. At least one or more portions of the current target image data are updated to depict or include representations of the variations in the preview subject's face that are modeled in the updated current target face model. More specifically, the updated current target image data depicts the variations between the current and/or updated facial expression of the preview subject, as depicted or represented in the current preview image data and the reference and/or initial facial expression of the preview subject, depicted or represented in the reference preview image data. Thus, the current target image data is edited to accurately depict and/or represent the variations, alterations, and/or distortions between the current facial expression and the reference facial expression of the preview subject.

At block 516, the updated current preview image is displayed. Furthermore, the current target image data may be simultaneously displayed in real time. For instance, each of the corresponding preview and target display windows in UI 100 in FIGS. 1B and 7A-8B shows the current preview image data and the updated current target image data. Note the correspondence and/or correlations between the varied features of the facial expression of the preview subject and the edited and/or updated features of the facial expression of the target subject.

At block decision block 518, it is determined whether to continue updating the current target image data. For instance, the editing process may continue until the preview subject (or another user) terminates the process via the start/stop button of UI 100. If the preview subject (or another user) terminates the editing process, process 500 terminates and/or returns a calling process. Otherwise, process 500 returns to block 506 to receive a next frame of current preview image data.

FIG. 5B illustrates another embodiment of a process flow for generating face models based on image data that is consistent with the various embodiments presented herein. According, process 520 of FIG. 5B includes various steps for generating target models (models for a target face) and/or references models (models for a preview face). Process 520 of FIG. 5B is discussed in conjunction with at least pseudo-code 600 of FIG. 6. Process 520 begins, at block 522, where a plurality of reference preview landmark points are determined based on the reference preview image data. More specifically, the plurality of reference preview landmark points are determined to model the reference or initial facial expression of the preview subject, as depicted in the reference preview image data. For instance, N reference preview landmark points are be determined, where N is an integer greater than 2, to model the facial features of the preview subject's reference facial expression. In some embodiments, N is approximately 300.

Each of the reference preview landmark points includes at least two spatial coordinates, such as but not limited to Cartesian coordinates (x,y). Determining the plurality of reference preview landmark points may include determining and/or generating each of the spatial coordinates for each of the N landmark points. As shown in lines 612, 616, and 618 of pseudo-code 600, the x-coordinate of the ith (where 0<i<N+1) reference preview landmark point is represented as $P_{RI}x$ and the y coordinate of the i-th reference preview landmark point is represented as $P_{RI}y$.

Also at block 522, the N corresponding current preview landmark points are determined. For instance, the spatial coordinates of each of the N reference preview landmark points may be copied, reproduced, and/or replicated to generate the N current preview landmark points. As shown in lines 614, 620, and 622 of pseudo-code 600, the x-coordinate of the ith current preview landmark point is represented as $P_{CI}x$ and the y coordinate of the i-th current preview landmark point is represented as $P_{CI}y$.

The reference and current preview face models may be generated based on the reference preview image data. Any of the various embodiments discussed in the '673 application may be employed to determine the plurality of reference/current preview landmark points and generating the reference/current preview face models at block 522. For instance, corresponding deformation fields, warpable elements, such as warpable vectors, and the like may be determined and or generated at block 522. FIG. 3 shows a face model 300 based on image data, that includes a plurality of landmark points.

Proceeding to block 524, a plurality of reference target landmark points are determined based on the reference target image data. More specifically, the plurality of reference target landmark points are determined to model the reference, initial, or unedited facial expression of the target subject, as depicted in the reference target image data. As further discussed below, an isomorphism between each of the reference/current preview face models and the reference/current target face models may be determined and/or generated. Thus, at least to generate an isomorphism between each of the four face models, the number of reference target landmark points determined at block 524 may be equivalent, or at least similar, to the number of reference/current preview landmark point (N) determined a block 522. N may be predetermined and/or provided by a user.

Similar to the reference preview landmark points, each of the reference target landmark points includes at least two spatial coordinates. Determining the plurality of reference target landmark points may include determining and/or generating each of the spatial coordinates for each of the target landmark points. As shown in lines 626 and 628 of pseudo-code 600, the x-coordinate of the ith reference target landmark point is represented as $L_{i\_Target}x$ and the y-coordinate of the i-th reference target landmark point is represented as $L_{i\_Target}y$.

Also at block 524, the N corresponding target preview landmark points are determined. For instance, the spatial coordinates of each of the N reference target landmark points may be copied, reproduced, and/or replicated to generate the N current target landmark points. As shown in lines 626 and 628 of pseudo-code 600, the x-coordinate of the ith current target landmark point is represented as $L'_{i\_Target}x$ and the y coordinate of the i-th current target landmark point is represented as $L'_{i\_Target}x$.

The reference and current target face models may be generated based on the reference target image data. Any of the various embodiments discussed in the '673 application may be employed to determine the plurality of reference/current target landmark points and generating the reference/current target face models at block 524. For instance, corresponding deformation fields, warpable elements, such as warpable vectors, and the like may be determined and or generated at block 524. FIG. 3 shows a face model 300 based on image data, that includes a plurality of landmark points.

At block 524, the isomorphism between each of the four face models with each of the other three face models may be generated. For instance, a correspondence, correlation, and/or a one-to-one mapping between each of the landmark points in each of the four face models with each of the landmark points in each of the other three face models may be determined and/or generated. Various embodiments for generating such an isomorphism between face models are discussed throughout, including at least in conjunction with processes 400 and 420 of FIGS. 4A and 4B respectively.

At block 526, one or more absolute dimensions of the reference preview face model are determined. Furthermore, one or more absolute dimensions of the reference target face model are determined. Various embodiments of determining the absolute dimensions of the reference preview/target face models are shown in at least pseudo-code 600 of FIG. 6. As shown in lines 602 and 604 in pseudo-code 600, at least an absolute height (represented by $H_R$) and an absolute width (represented by $W_R$) of the reference preview face model are determined at block 536. Furthermore, at least an absolute height (represented by Height of Target Face) and an absolute width (represented by Width of Target Face) of the reference target face model are determined.

At block 528, the reference preview face model is normalized based on the absolute dimensions of the reference preview face model. Various embodiments for normalizing the reference preview face model are discussed in the conjunction with at least process 560 of FIG. 5D and pseudo-code 600 of FIG. 6. However, briefly and as shown in lines 616 and 618 of pseudo-code 600, normalizing the reference preview face model includes updating each of the spatial coordinates of each of the reference preview landmark points based on the absolute height and absolute width of the reference preview model.

FIG. 5C illustrates another embodiment of a process flow for updating face models based on image data that is consistent with the various embodiments presented herein.

According, process 540 of FIG. 5C includes various steps for updating target models (models for a target face) based on a comparison of an updated current model for a preview face and a reference model for the preview face. Process 540 begins, after a start block, at block 542 where the current preview landmark points are updated based on the current preview image data. For instance, each of the spatial coordinates ($P_{CI}x$ and $P_{CI}y$) for each of the N current preview landmark points may be updated and/or adjusted based on the current preview image data. For instance, $P_{CI}x$ and $P_{CI}y$ for each of the current preview landmark points may be updated and/or adjusted to model the current facial expression of the preview subject, as depicted in the current preview image data. Any of the embodiments discussed in the '673 application may be employed to update the current preview landmark points based on the current preview image data.

At block 544, one or more absolute dimensions of the updated current preview face model are determined. Various embodiments of determining the absolute dimensions of the updated preview face model are shown in at least pseudo-code 600 of FIG. 6. As shown in lines 606 and 608 in pseudo-code 600, at least an absolute height (represented by $H_C$) and an absolute width (represented by $W_C$) of the updated current preview face model are determined.

At block 546, the updated current preview face model is normalized based on the absolute dimensions of the updated current preview face model. Various embodiments for normalizing the reference preview face model are discussed in the conjunction with at least process 560 of FIG. 5D and pseudo-code 600 of FIG. 6. However, briefly and as shown in lines 620 and 622 of pseudo-code 600, normalizing the current preview face model includes updating each of the spatial coordinates of each of the current preview landmark points based on the absolute height and absolute width of the current preview model.

At block 548, one or more normalized displacements of each of the current preview landmark points are determined. Various embodiments for determining the normalized displacements of the current preview landmark points are discussed in the conjunction with at least process 560 of FIG. 5D and pseudo-code 600 of FIG. 6. However, briefly determining the normalized displacements of the current preview landmark points is based on a comparison of each of the normalized current preview landmark points and the corresponding normalizes reference preview landmark point. A two-dimensional displacement for a particular current preview landmark point may be represented as $D_p = (D_p x, D_p y)$. Line 624 of pseudo-code 600 shows one embodiment of such a comparison that is based on a difference of the corresponding current/reference preview landmark points.

At block 550, one or more absolute displacements of each of the current target landmark points are determined. Various embodiments for determining the absolute displacements of the current target landmark points are discussed in the conjunction with at least process 560 of FIG. 5D and pseudo-code 600 of FIG. 6. However, briefly determining the absolute displacements of the current target landmark points are based on the absolute dimensions of the reference target face model. Various embodiments for determining the absolute dimensions of the reference target face model are discussed throughout, including at least in conjunction with process 520 of FIG.

Determining the absolute displacements of a particular current target landmark points may be based on the normalized displacements of the corresponding current preview landmark point, as determined in block 548. Factor 636 of line 626 of pseudo-code 600 shows one embodiment for determining the x-component of the normalized displacement of a current target landmark point based on the absolute width of the reference target model. Similarly, factor 638 of line 628 of pseudo-code 600 shows one embodiment for determining the y-component of the normalized displacement of a current target landmark point based on the absolute height of the reference target model.

At block 552, the current target landmark points are updated based on the absolute displacements of the current target landmark points and the corresponding reference target landmark points. Various embodiments for determining the absolute displacements of the current target landmark points are discussed in the conjunction with at least process 560 of FIG. 5D and pseudo-code 600 of FIG. 6. However briefly, each of the spatial coordinates ($L'_{i\_Target}x$ and $L'_{i\_Target}x$) for each of the N current target landmark points may be updated based on the spatial coordinates ($L_{i\_Target}x$ and $L_{i\_Target}x$) of the corresponding reference target landmark points and the normalized displacements, as shown in lines 626 and 628 of pseudo-code 600. When updated, the current target face model models at least the variations between the current and/or updated facial expression of the preview subject, as depicted or represented in the current preview image data and the reference and/or initial facial expression of the preview subject, as depicted or represented in the reference preview image data.

Figure 5D:
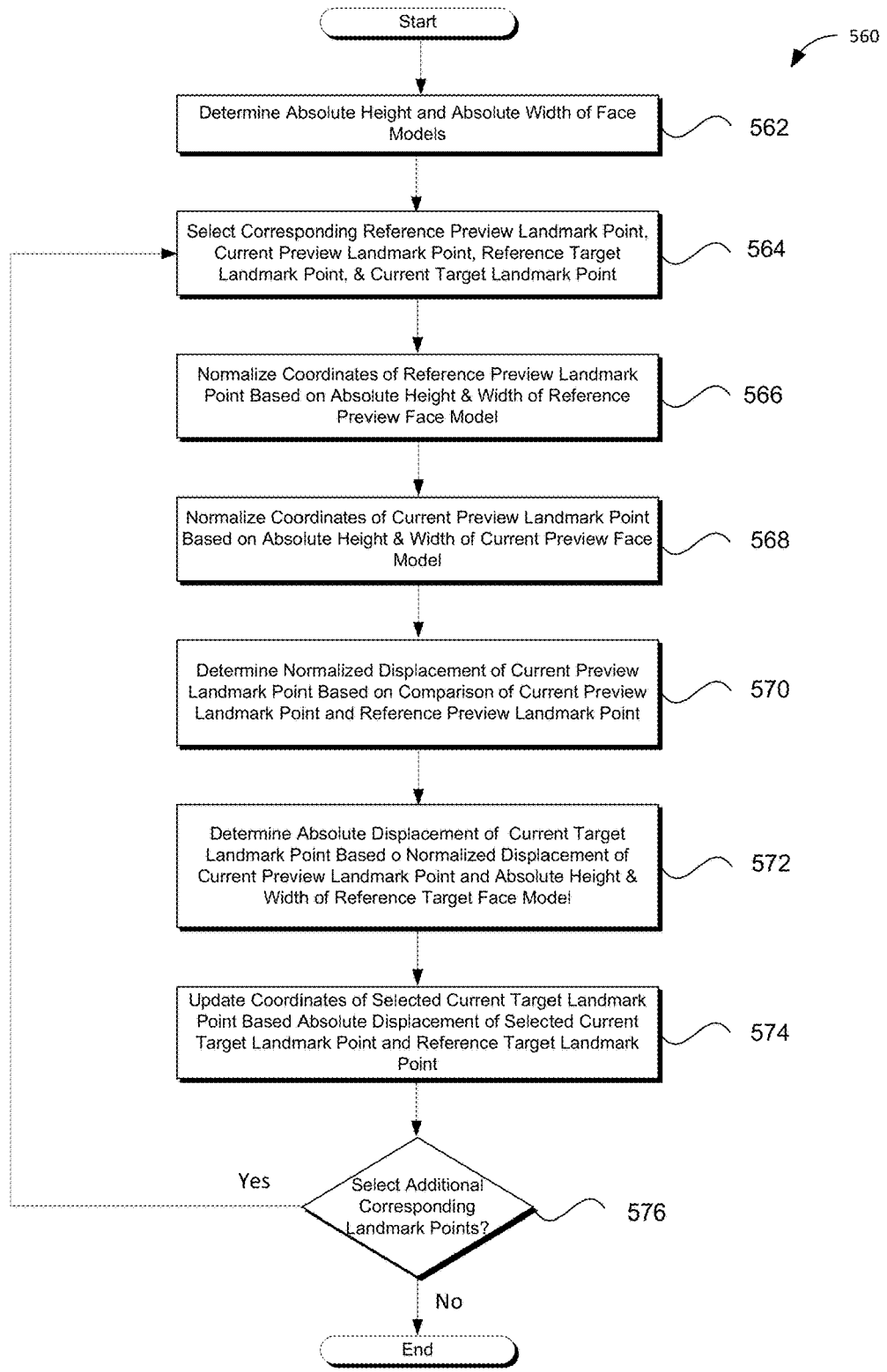
FIG. 5D illustrates still another embodiment of a process flow for updating face models based on image data that is consistent with the various embodiments presented herein.

FIG. 5D illustrates still another embodiment of a process flow for updating face models based on image data that is consistent with the various embodiments presented herein. Pseudo-code 600 of FIG. 6 shows one exemplary, but non-limiting, implementation of the various embodiments of process 560 of FIG. 5D. According, process 560 of FIG. 5D and pseudo-code of FIG. 6 include various steps for updating target models (models for a target face) based on a comparison of an updated current model for a preview face and a reference model for the preview face. For instance, as described below, various lines in pseudo-code show steps for determining displacements for landmark points in the face models, as well as normalizing face models and determining comparisons between updated and reference face models.

Process 560 begins, after a start block, at block 562 where the absolute height and the absolute width of each of the reference preview, current preview, and reference target face models is determined. At least lines 602, 604, 606, and 608 of pseudo-code 600 show notations for determining the absolute dimensions of the preview face models.

At block 564, corresponding reference preview, current preview, reference target, and current target landmark points are selected. For instance, the corresponding i-th landmark point in each of the four face models is selected, where 0<i<N+1. In terms of pseudo-code 600, block 564 may occur at the beginning of each iteration of loop 610. Note, loop 610 is iterated over N times.

At block 566, the spatial coordinates of the selected reference preview landmark point are normalized. As shown in lines 616 and 618 of pseudo-code 600, normalizing the reference preview landmark point is based on the absolute height and width of the reference preview face model.

At block 568, the spatial coordinates of the selected current preview landmark point are normalized. As shown in lines 620 and 622 of pseudo-code 600, normalizing the current preview landmark point is based on the absolute height and width of the current preview face model.

At block 570, the normalized displacement of the selected current preview landmark point is determined. As shown in line 624 of pseudo-code 600, the normalized displacement may be based on a comparison of the normalized selected current preview landmark point and the corresponding (selected) normalized reference preview landmark point. The comparison may include a difference (in each spatial dimension) between the compared landmark points. The normalized displacement may include an x-component displacement and a y-component displacement.

At block 572, the absolute displacement of the selected current preview landmark point is determined. As shown in factor 636 of line 626 and factor 638 of line 628 of pseudo-code 600, the absolute displacement may be based on normalized displacement of the selected current preview landmark point and the absolute height/width of the reference target face model. As shown in lines 626 and 628, the absolute displacement may include an x-component (based on the absolute width of the reference target face model) displacement and a y-component (based on the absolute height of the reference target face model) displacement.

At block 574, the spatial coordinates of the selected current target landmark point are updates. As shown in line 626 and line 628 of pseudo-code 600, the updating the coordinates may be based on absolute displacement of the selected current target landmark point and the coordinates of the selected reference target landmark point. As shown in lines 626 and 628, updating the coordinates may include updating each of the x-component and the y-component displacement of the current target landmark point.

At decision block 776, it is determined whether to select another set of corresponding reference preview, current preview, reference target, and current target landmark points. For instance, loop 610 of pseudo-code 600 may be iterated over a total of N times. If another corresponding set of landmark points is to be selected, process 574 flows back to block 564. Otherwise, process 560 may terminate and/or return a calling process.

Illustrative Operating Environment

Figure 9:
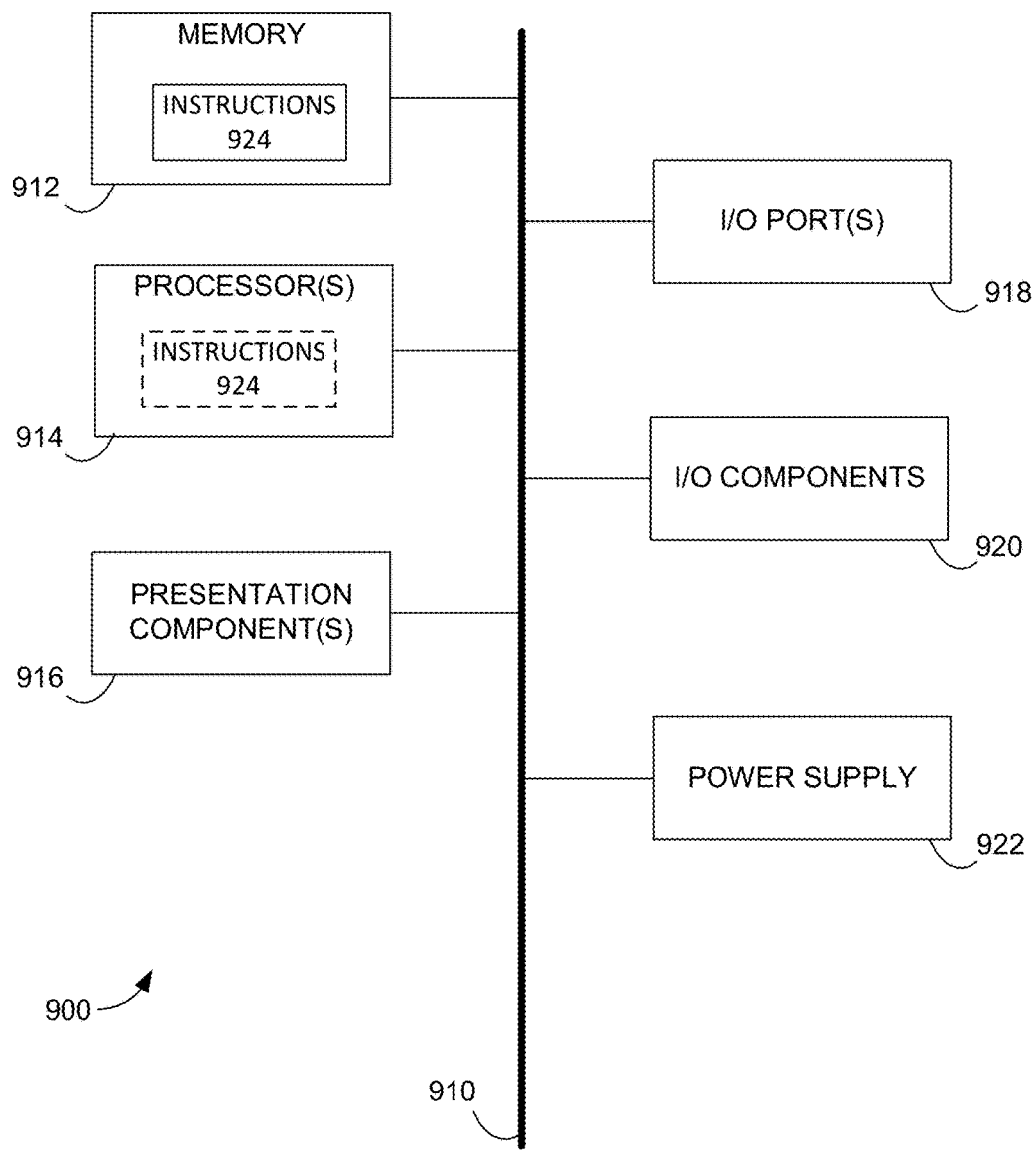
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-readable storage medium having instructions stored thereon for editing image data of a target face that includes a first expression, which, when executed by a processor of a computing device provide the computing device with a face-editing engine to:
    receive the image data of the target face that includes the first expression;
    generate a model for the target face that includes a plurality of target landmark points based on the first expression of the target face;
    receive current image data of a preview face that includes a second expression;
    update the model for the target face based on a one-to-one mapping between each of the plurality of target landmark points and corresponding each of a plurality of preview landmark points that are based on the second expression of the preview face, the one-to-one mapping indicating a correlation between paired landmark points, each pair of paired landmark points including one of the plurality of target landmark points and one of the plurality of preview landmark points, wherein at least a portion of the plurality of target landmark points are updated in the updated model for the target face by applying one or more spatial displacements to the portion of the plurality of target landmark points, the one or more spatial displacements determined based on spatial variations between the portion of the plurality of landmark points and a corresponding portion of the plurality of preview landmark points that are identified based on the one-to-one mapping; and
    update the image data of the target face based on the updated portion of the plurality of target landmark points included in the updated model for the target face.

2. The computer-readable storage medium of claim 1, wherein the face-editing engine is further to:
    receive reference image data of the preview face;
    generate a model for the preview face based on the reference image data of the preview face;
    update the model for the preview face based on the current image data of the preview face; and
    update the model for the target face further based on the updated model for the preview face.

3. The computer-readable storage medium of claim 1, wherein the face-editing engine is further to:
    generate a reference model for the preview face based on reference image data of the preview face;
    update a current model for the preview face based on the current image data of the preview face; and
    update the model for target face based on a comparison of the updated current model for the preview face and the reference model for the preview face.

4. The computer-readable storage medium of claim 1, wherein the face-editing engine is further to:
    determine an isomorphism between a current model for the preview face and the model for the target face;
    update the current model for the preview face based on the current image data for the preview face; and
    update the model for the target face based on the updated current model for the preview face and the isomorphism between the current model for the preview face and the model for the target face.

5. The computer-readable storage medium of claim 1, wherein the face-editing engine is further to:

determine a plurality of reference landmark points based on reference image data of the preview face;

generate a model for the preview face based on the plurality of reference landmark points;

determine the plurality of target landmark points based on the image data of the target face;

generate the model for the target face further based on the plurality of target landmark points;

determine a one-to-one mapping between each of the plurality of reference landmark points and each of the plurality of target landmark points; and update the model for the target face further based on the one-to-one mapping between each of the plurality of reference landmark points and each of the plurality of target landmark points.

6. The computer-readable storage medium of claim 1, wherein the face-editing engine is further to:

update a current model for the preview face based on the current image data of the preview face;

generate a comparison between the updated current model for the preview face and a reference model for the preview face to determine a preview displacement for each of the plurality of preview landmark points based on the comparison between the updated current model for the preview face and the reference model for the preview face; and generate a target displacement for each of the plurality of target landmark points based on the preview displacement for each of the plurality of preview landmark points; and update the model for the target face further based on the target displacement for each of the plurality of target landmark points.

7. The computer-readable storage medium of claim 1, wherein the face-editing engine is further to:

normalize a reference model for the preview face based on one or more reference spatial dimensions of the reference model for the preview face;

update a current model for the preview face based on the current image data of the preview face;

normalize the updated current model for the preview face based on one or more current spatial dimensions of the updated current model for the preview face;

determine a plurality of preview displacements for the normalized current model for the preview face based on a difference between the normalized current model for the preview face and the normalized reference model for the preview face; and update the model for the target face further based on the plurality of preview displacements for the normalized current model for the preview face and one or more spatial dimensions of the model for the target face.

8. A method for editing image data of a target face, comprising:

steps for generating each of a target model and a reference model, wherein the target model is based on the image data of the target face and the reference model is based on reference image data of a preview face; and steps for updating the image data of the target face based on an updated target model generated from an updated current model, the updated current model generated from a one-to-one mapping between each of a plurality of current points associated with current image data and corresponding each of a plurality of preview points associated with the reference model, the one-to-one mapping indicating a correlation between paired landmark points, each pair of the paired landmark points including one of the plurality of current points and one of the plurality of preview points, wherein at least a portion of a plurality of target points are updated in the updated target model based on the updated current model by applying one or more displacements to the portion of the plurality of target points based on variations detected between the portion of the plurality of target points and corresponding portion of plurality of current points that are identified based on the one-to-one mapping.

9. The method of claim 8, further comprising:

steps for determining a preview displacement for each of the plurality of preview points based on the comparison of the updated current model and the reference model; and steps for determining a target displacement for each of the plurality of target points based on the preview displacement for each of the plurality of preview points, wherein the steps for updating the target model are further based on the target displacement for each of the plurality of target points.

10. The method of claim 8, further comprising:

steps for normalizing the reference model based on one or more reference spatial dimensions of the reference model;

steps for normalizing the updated current model based on one or more current spatial dimensions of the updated current model; and steps for determining the comparison of the updated current model and the reference model that are based on a difference between the normalized updated current model and the normalized reference model.

11. The method of claim 8, wherein updating the image data of the target face includes modifying a feature of the target face based on a difference of a corresponding feature of the preview face between the current image data of the preview face and the reference image data of the preview face.

12. The method of claim 8, further comprising:

employing one or more image sensor devices to capture the current image data of the preview face; and employing a display device to simultaneously display the current image data of the preview face and the updated image data of the target face to a user, wherein the preview face is a face of the user.

13. The method of claim 8, further comprises:

capturing preview video data that includes a plurality of preview data frames of the preview face;

updating the current model, for each of the plurality of preview data frames, based on the preview data frame;

steps for updating the target model, for each of the plurality of preview data frames, based on the updated current model;

updating the image data of the target face, for each of the plurality of preview data frames, based on the updated target model;

generating a corresponding target data frame that includes the updated image data of the target face, for each of the plurality preview data frames; and providing target video data that includes the plurality of target data frames of the target face.

14. The method of claim 8, further comprises:

receiving one or more scaling parameters; and updating the comparison of the updated current model and the reference model based on the one or more scaling parameters.

15. A system for editing image data of a target face, comprising:
  a camera device that captures a first frame of a preview face and a second frame of the preview face;
  a processor device; and
  a computer-readable storage medium, coupled with the processor device, having instructions stored thereon, which, when executed by the processor device, provide the computing system with a face-editing engine to:
    receive, via the camera device, the first and the second frames of the preview face;
    generate a reference model for the preview face based on the first frame of the preview face;
    generate a target model for the target face based on a first frame of a target face;
    update a current model for the preview face based on the second frame of the preview face;
    update the target model for the target face based on the updated current model for the preview face, a first mapping between the reference model for the preview face and the current model for the preview face, and a second mapping between the updated current model for the preview face and the target model for the target face, each of the first mapping and the second mapping including a one-to-one mapping indicating a correlation between paired landmark points of corresponding models; and
    update a second frame of the target face based on the updated target model for the target face.

16. The system of claim 15, further comprising a display device that simultaneously displays the second frame of the preview face and the second frame of the target face.

17. The system of claim 15, wherein each of the reference, the target, and the current models includes an equivalent number of landmark points, and wherein the first mapping includes a first one-to-one correspondence between the landmark points included in the reference model and the landmark points included in the current model and the second mapping includes a second one-to-one correspondence between the landmark points included in the current model and the landmark points included in the target model.

18. The system of claim 15, wherein the face-editing engine is further to:
  generate a comparison of the updated current model and the reference model for the preview face based on the first mapping between the reference model and the current model for the preview face;
  determine a first plurality of spatial displacements associated with the updated current model based on the comparison of the updated current mode and the reference model for the preview face; and
  determine a second plurality of spatial displacements associated with the target model based on the first plurality of spatial displacements associated with the updated current model and the second mapping between the current model for the preview face and the target model for the target face; and
  update the target model for the target face based on the second plurality of spatial displacements associated with the target model.

19. The system of claim 15, wherein the face-editing engine is further to:
  normalize the reference model for the preview face based on one or more spatial dimensions of the reference model for the preview face;
  normalize the current model for the preview face based on one or more spatial dimensions of the current model for the preview face; and
  update the target model for the target face based on the normalized reference model for the preview face, the normalized current model for the preview face, and one or more spatial dimensions of the target model for the target face.

20. The system of claim 15, wherein the camera device provides the first frame and the second frame of the preview face in real time during the capture of the first frame and the second frame of the preview face.

* * * * *